(12) United States Patent
Shavit et al.

(10) Patent No.: US 8,302,105 B2
(45) Date of Patent: Oct. 30, 2012

(54) BULK SYNCHRONIZATION IN TRANSACTIONAL MEMORY SYSTEMS

(75) Inventors: Nir N. Shavit, Cambridge, MA (US); David Dice, Foxboro, MA (US)

(73) Assignee: Oracle America, Inc., Redwood City, CA (US)

( * ) Notice: Subject to any disclaimer, the term of this patent is extended or adjusted under 35 U.S.C. 154(b) by 530 days.

(21) Appl. No.: 12/492,627

(22) Filed: Jun. 26, 2009

(65) Prior Publication Data
US 2010/0333095 A1  Dec. 30, 2010

(51) Int. Cl.
*G06F 9/46* (2006.01)
*G06F 17/00* (2006.01)

(52) U.S. Cl. ........................ 718/106; 707/704
(58) Field of Classification Search .................. 718/106, 718/101
See application file for complete search history.

(56) References Cited

U.S. PATENT DOCUMENTS

| | | | |
|---|---|---|---|
| 5,937,187 A | 8/1999 | Kosche et al. | |
| 6,026,474 A * | 2/2000 | Carter et al. | 711/202 |
| 6,523,078 B1 * | 2/2003 | Desai | 710/200 |
| 6,633,964 B2 * | 10/2003 | Zimmer et al. | 711/163 |
| 6,799,236 B1 | 9/2004 | Dice et al. | |
| 7,173,062 B2 | 2/2007 | Roh et al. | |
| 7,512,950 B1 * | 3/2009 | Marejka | 718/106 |
| 7,669,015 B2 * | 2/2010 | Dice et al. | 711/152 |
| 2006/0031844 A1 * | 2/2006 | Dice et al. | 718/106 |

OTHER PUBLICATIONS

Christoph Lameter, Ph.D., "Effective Synchronization on Linux/NUMA Systems," Gelato Conference 2005 May 20, 2005, Silicon Graphics, Inc.
Mellor-Crummey, et al., "Scalable Reader-Writer Synchronization for Shared-Memory Multiprocessors," ACM 1991, 8 pages.
Garthwaite, Dice, White, "Supporting per-processor local-allocation buffers using lightweight user-level preemption notification," Copyright 2005 Sun Microsystems, Inc., VEE'05, Jun. 1112, 2005, Chicago, Illinois, USA. ACM1-59593-047-7/05/0006.
Dice, et al., "Mostly Lock-Free Malloc," ISMM 2002, 12 pages.
Dice, et al., "Supporting Per-processor Local-allocation Buffers Using Multi-processor Restartable Critical Sections," Mar. 2004, Sun Labs Technical Report TR-2004-126, 44 pages.
U.S. Appl. No. 10/669,948, filed Sep. 24, 2003.
Kenneth Russell, David Detlefs, "Eliminating Synchronization-Related Atomic Operations with Biased Locking and Bulk Rebiasing," OOSPLA 2006.

(Continued)

*Primary Examiner* — Meng An
*Assistant Examiner* — Wissam Rashid
(74) *Attorney, Agent, or Firm* — Robert C. Kowert; Meyertons, Hood, Kivlin, Kowert & Goetzel, P.C.

(57) ABSTRACT

A method and system for acquiring multiple software locks in bulk is disclosed. When multiple locks need to be acquired, such as for atomic transactions in transactional memory systems, the disclosed techniques may be applied to consolidate computationally expensive memory barrier operations across the lock acquisitions. A system may acquire multiple locks in bulk, at least in part, by modifying values in one or more fields of multiple locks and by then performing a memory barrier operation to ensure that the modified values in the multiple locks are visible to other application threads. The technique may be repeated for locks that the system fails to acquire during earlier iterations until all required locks are acquired. The described technique may be applied to various scenarios including static and/or dynamic transactional locking protocols.

20 Claims, 17 Drawing Sheets

OTHER PUBLICATIONS

Dice, Lev, Moir, Nussbaum, "Early Experience with a Commercial Hardware Transactional Memory Implementation," Accepted in ASPLOS 2009, Sun Microsystems, Inc.

F. Ellen, Y. Lev, V. Luchangco, and M. Moir, "SNZI: Scalable Non-Zero Indicators," PODC 2007, Sun Microsystems, Inc.

U.S. Appl. No. 11/939,372, filed Nov. 13, 2007.

Dave Dice, et al., "What Really Makes Transactions Faster?," Transact 2006, Sun Microsystems, Inc.

Dave Dice, Nir Shavit, "Understanding Tradeoffs in Software Transactional Memory," IEEE, International Symposium on Code Generation and Optimization (CGO'07).

Dave Dice, Ori Shalev, Nir Shavit, "Transactional Locking II," Disc'2006, Stockholm.

Spear, et al., "Privatization Techniques for Software Transactional Memory," PODC'07, Aug. 12-15, 2007, Portland, Oregon, USA. ACM.

Virendra J. Marathe, Michael F. Spear, and Micheal L. Scott, "Scalable Techniques for Transparent Privatization in Software Transactional Memory," ICPP 2008.

Vijay Menon, et al. "Single Global Lock Semantics in a Weakly Atomic STM," 2008.

Lourenco & Cuhna, "Testing Patters for Software Transactional Memory Engines," PADTAD'07, Jul. 9, 2007, London, England, United Kingdom, Copyright 2007 ACM.

Michael F. Spear, et al., "RingSTM: scalable transactions with a single atomic instruction," SPAA 2008.

Justin Gottschlich, et al., "DracoSTM: A Practical C++ Approach to Software Transactional Memory," Copyright 2007 ACM.

Enrique Vallejo, et al., "Hybrid Transactional Memory to Accelerate Safe Lock-based Transactions," Microsoft Research 2008.

Yossi Lev, et al., "Anatomy of a Scalable Software Transactional Memory," Copyright 2009 Sun Microsystems, Inc. All rights reserved.

Yang Ni, et al., "Design and Implementation of Transactional Constructs for C/C++," OOPSLA'08, Oct. 19-23, 2008, Nashville, Tennessee, USA, Copyright 2008 ACM.

Florian T. Schneider, "Dynamic Optimization for Efficient Strong Atomicity," OOPSLA'08, ACM.

Adam Welc, et al., "Irrevocable Transactions and their Applications," SPAA'08, Jun. 2008, Munich, Germany. Copyright 2008 ACM.

Lukasz Ziarek, et al. "A Uniform Transactional Execution Environment for Java," ECOOP 2008.

Dice, et al., "TLRW: Return of the Read-Write Lock," 2009.

U.S. Appl. No. 12/350,792, filed Jan. 8, 2009.

David Dice's Weblog, "CAS and Cache Trivia-Invalidate or Update in-Place," Mar. 14, 2008.

David Dice's Weblog, "Hardware-assisted transactional read-set validation," Oct. 2, 2006.

David Dice's Weblog, "Biased Locking in HotSpot," Aug. 18, 2006.

"Solaris Read-Write locks", 2008 Sun Microsystems, Inc.

"Interface ReadWriteLock," Java2 Platform, Standard Ed. 5.0, 2004 Sun Microsystems, Inc., found at http://java.sun.com/j2se/1.5.0/docs/api/java/util/concurrent/locks/ReadWriteLock.html.

"Class ReentrantReadWriteLock," Java2 Platform, Standard Ed. 5.0, Sun Microsystems, Inc., found at http://java.sun.com/j2se/1.5.0/docs/api/java/util/concurrent/locks/ReentrantReadWriteLock.html.

U.S. Appl. No. 12/492,613, filed Jun. 26, 2009.

U.S. Appl. No. 12/492,654, filed Jun. 26, 2009.

\* cited by examiner

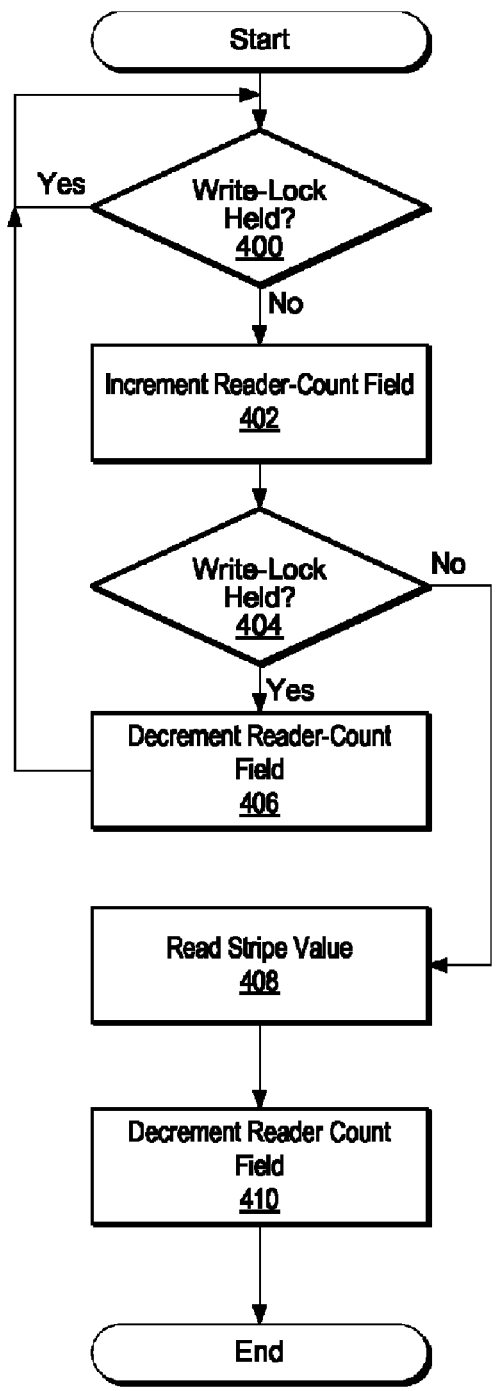
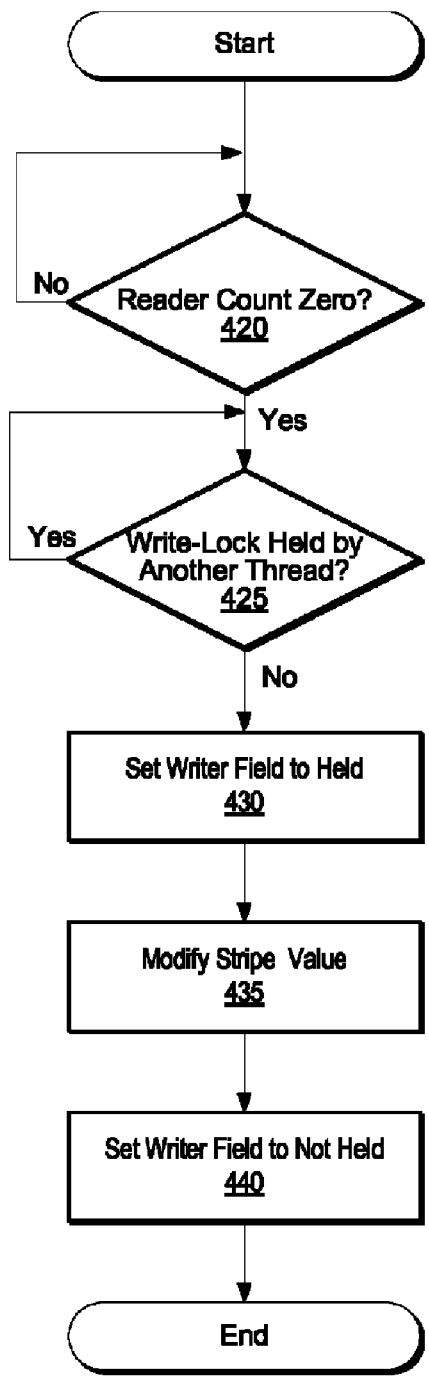
*FIG. 4a*  *FIG. 4b*

BULK SYNCHRONIZATION IN TRANSACTIONAL MEMORY SYSTEMS

BACKGROUND

In some computer programs, multiple program threads may execute concurrently on a single system and may access shared memory locations. The interleaved execution of such threads in shared-memory, multi-threaded computing environments may cause one or more of the threads to execute incorrectly. For example, if two threads in a banking application are each configured to execute a withdrawal by first checking for sufficient account balance and then making the withdrawal, then incorrect interleaved execution may result if, for instance, both threads perform the account balance check before either thread withdraws the money, resulting in a negative account balance. Thus, interleaved execution of the two threads may result in incorrect program behavior, commonly known as race conditions, which must be avoided.

Programmers of concurrent systems must take care to avoid inopportune interleavings of concurrent operations. To ensure correctness, programmers often rely on various concurrency control mechanisms, such as synchronization locks. A lock is a software or hardware construct associated with one or more memory locations. In some lock implementations, a thread must hold a lock associated with a given memory location before it may read from and/or write to that location.

Transactional memory is a concurrent programming paradigm that may allow a programmer to designate a section of code as atomic. A transactional memory implementation then ensures, via underlying software and/or hardware mechanisms, that such critical sections are executed atomically (i.e., all at once) with respect to other threads in the system. For instance, in the banking example above, a programmer may designate that the account balance check and the withdrawal operation should be executed together atomically with respect to other threads. Thus, by forbidding the interleaved execution described above, the race condition may be obviated. Transactional memory may be implemented in hardware, software, or a combination thereof.

SUMMARY

In multi-threaded programs using various types of locks for concurrency control, a thread may occasionally need to acquire multiple locks. For example, in some transactional locking schemes, a thread (or transactional memory system) may need to acquire a plurality of locks before committing an atomic transaction.

In various situations, acquiring a lock may require that one or more relatively expensive operations be performed. For example, in some out-of-order systems, acquiring a lock may comprise updating a value in one of the lock's fields and then executing a memory barrier operation, which may ensure that the updating is performed before any store operations that appear after the memory barrier in program order.

In various embodiments, multiple locks may be acquired in bulk, such that relatively expensive operations, such as memory barriers, may be consolidated across lock acquisitions. This technique may be referred to as bulk synchronization. For example, bulk synchronization may comprise updating values in a plurality of software locks without executing a memory barrier operation after every one, and once the multiple updates have been performed, a single memory barrier operation may be executed to enforce program ordering, as described above. Thus, the single memory barrier operation may be consolidated among the multiple lock acquisitions.

Various embodiments are described herein, including the application of bulk synchronization to static transactions, dynamic transactions using CAS-less byte locks, and dynamic transactions using the TL2 protocol.

BRIEF DESCRIPTION OF THE DRAWINGS

FIG. 4a is a flow diagram illustrating a method for acquiring a read-write lock for reading, according to one embodiment.

FIG. 4b is a flow diagram illustrating a method for acquiring a read-write lock for writing, according to one embodiment.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Transactional memory is a concurrency control mechanism for controlling access to shared memory in concurrent, multi-threaded systems. Such a system may allow critical sections of code to be designated and executed as atomic blocks with respect to the execution of other threads. For example, in one implementation, a transactional memory system may guarantee that if a thread executing a transaction reads a value from memory, then the value will not be modified by other threads before the thread finishes executing the transaction.

It may be desirable for a transactional memory implementation to be efficient and allow as much multi-threaded concurrency as possible while still ensuring correct program behavior. An efficient transactional memory system may be implemented as described herein. In various embodiments, the transactional memory system may be implemented using transactional locking with different variations of read-write locks and/or with bulk synchronization techniques, as described herein.

Figure 1:
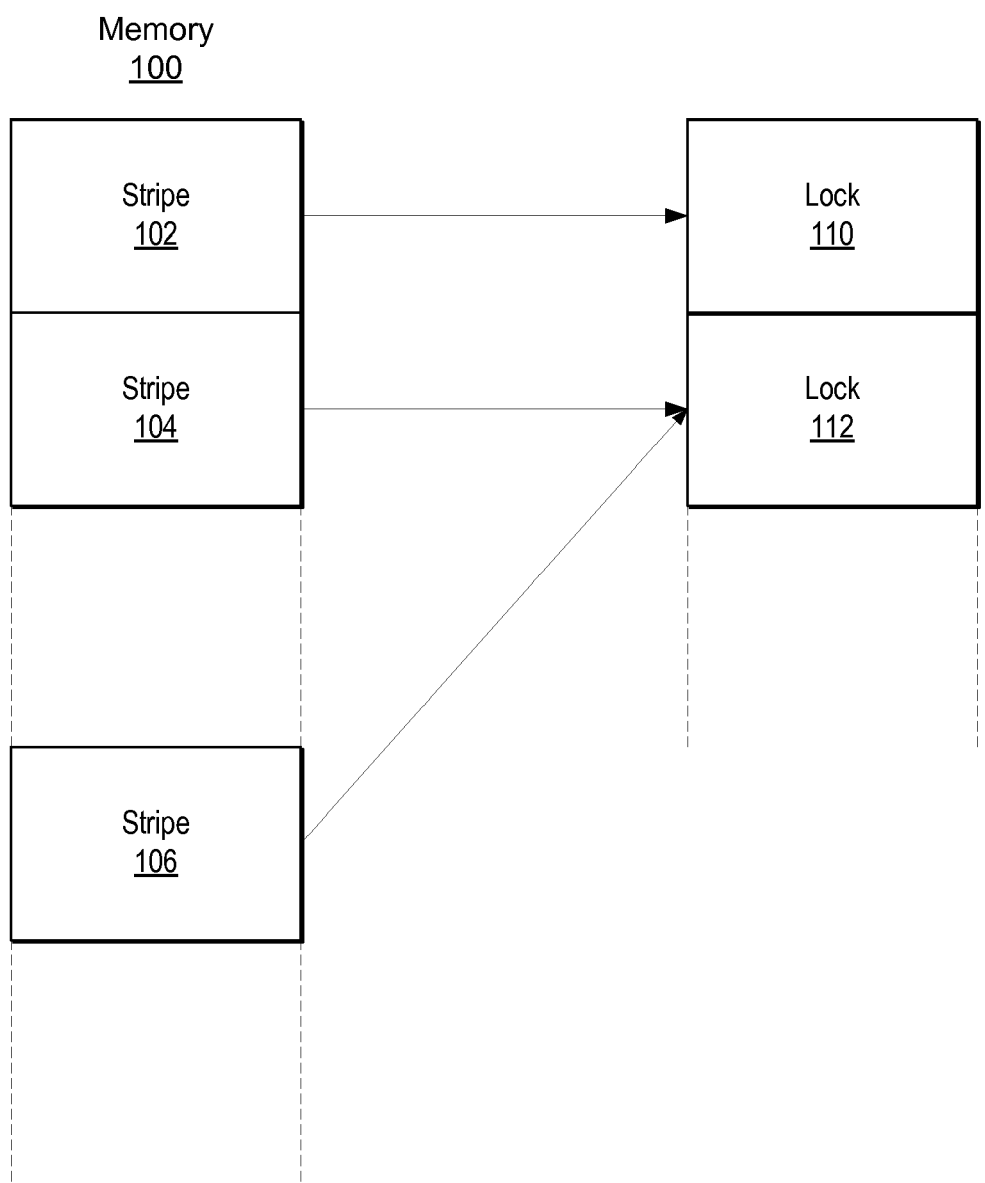
FIG. 1 is a block diagram the mapping of memory stripes to lock metadata, according to one embodiment.

In various embodiments, all or a portion of a system's memory may be partitioned into one or more stripes. A stripe may be a contiguous region of shared memory. In some embodiments, each stripe may be associated with one or more locks, which may be used to control access to that stripe. For example, FIG. 1 illustrates a striping scheme, according to one embodiment. In the illustrated embodiment, computer memory 120 is partitioned into multiple stripes (e.g., 122, 124, and 126), each of which is associated with a corresponding lock (e.g., 130, 132). The locks may be used as a concurrency control mechanism to regulate concurrent access to the associated stripes. In various embodiments, the locks and stripes comprise transactional metadata, which may not be exposed to an application programmer, but rather, used by an underlying transactional memory system as described below.

In the embodiment of FIG. 1, each stripe in memory 120 is associated with a lock, such as lock 130 or 132. The arrows of FIG. 1 illustrate this association. Thus, in the illustrated embodiment, stripe 122 is associated with lock 130 while stripe 124 is associated with stripe 132. In various embodiments, a lock may be associated with more than one stripe. For example, in the illustrated embodiment, both stripe 122 and stripe 126 are associated with the same lock 132. In various embodiments, any scheme may be used for assigning locks to stripes. For example, in one embodiment, a hash function of the memory address of each stripe may be used to determine with which of a fixed number of predefined locks the stripe should be associated.

In some embodiments, memory may be partitioned into stripes of equal width (e.g., same number of bits). For example, in one embodiment, memory may be partitioned into stripes of one word each. In some embodiments, the stripe width may be chosen in light of hardware parameters. For example, in one embodiment, the stripe width may be the same as the width of a cache line on a deployment machine or a multiple of that width. In one such embodiment, a software transactional memory system may be configured to detect the width of a local cache and choose a stripe length accordingly (e.g., set the stripe width to a multiple of the cache width). In some embodiments, narrower stripe widths may be chosen to increase concurrency. In other embodiments, wider stripe widths may be chosen to reduce the cost of other expensive concurrency operations as described below.

In some embodiments, stripes may be of variable size. For example, in some embodiments, memory may be partitioned along boundaries corresponding to various data structures and/or objects in memory. Thus, in such embodiments, a lock may be assigned to one or more memory objects, which may each be of variable size.

In various embodiments, in order to read or modify values in a memory stripe, a thread must hold the associated lock. For example, before a thread modifies a value in memory stripe 122, it must acquire and hold the associated lock 130. In various embodiments, various types of locks may be used and each thread may acquire and/or hold a lock according to various protocols. For example, in one embodiment, each lock (e.g., 130) may be implemented as a simple semaphore or mutual-exclusion lock that may signify one of two states: held or released. To enforce mutual exclusion, the concurrency control protocol may require a thread to wait for the lock to become released, acquire the lock by changing the state to held, and only then proceed with access to the associated stripe.

In other embodiments, rather than simple semaphores, different types of locks may be used. For example, locks 130 and 132 may comprise read-write locks. A read-write lock may allow concurrent read access to a memory location and/or memory object but require exclusive write-access. That is, in such embodiments, the lock acquisition/release protocol may allow multiple threads to hold the lock for reading the associated stripe. However, as before, only a single thread may acquire hold the lock for write permissions (i.e., for modifying one or more values in the stripe) at any given time.

Figure 2:
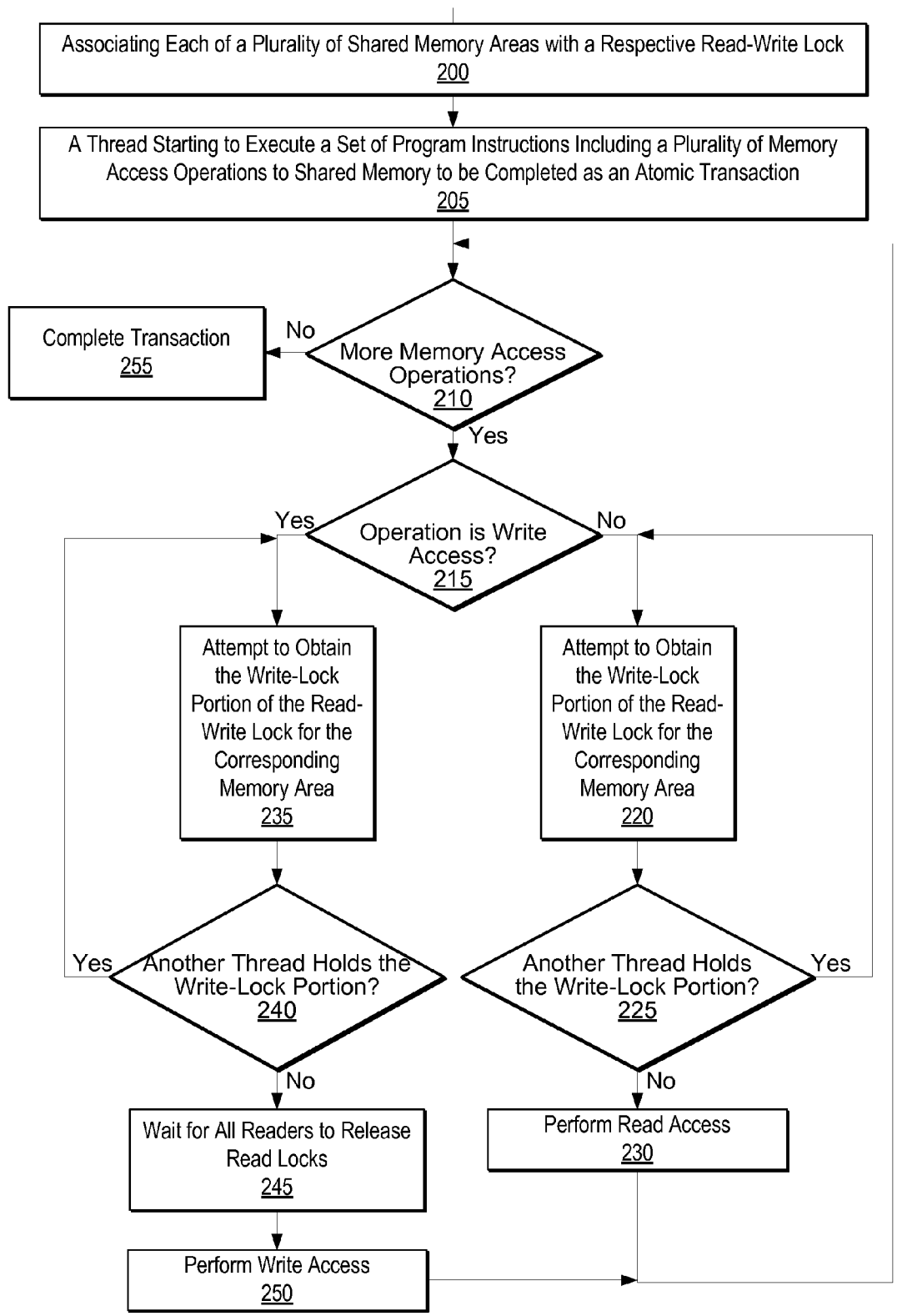
FIG. 2 is a block diagram illustrating a read-write lock, according to one embodiment.

FIG. 2 is a flowchart depicting a general method for implementing transactional locking with read-write locks, according to some embodiments. The method of FIG. 2 may begin as in 200 by associating each of a plurality of shared memory areas with a respective read-write lock, as discussed earlier. A read-write lock may comprise a read-lock portion and a write-lock portion.

According to the illustrated method, a thread may begin executing an atomic transaction comprising a plurality of memory operations, as in 205. In some embodiments, an atomic transaction may execute atomically with respect to other transactions. In the illustrated embodiment, before performing each memory access, the thread must acquire the proper read or write lock associated with the memory area to be accessed. For example, if the memory operation comprises a write operation, as indicated by the affirmative exit from 215, the thread must obtain the write-lock associated with the memory area before performing the operation. Otherwise, if the memory access does not comprise a write access (e.g., the memory access is a read operation), as indicated by the negative exit from 215, the thread may attempt to obtain the read-lock portion of the read-write lock for the corresponding shared memory area.

According to the illustrated embodiment, if the thread attempts to obtain the read-lock portion of the read-write lock to acquire read permission on the read-write lock, as in 220, it may not succeed if another thread already holds the write-lock portion of the lock, as indicated by the affirmative exit from 225. However, if no other thread holds the write-lock, as indicated by the negative exit from 225, the thread may successfully acquire the read-lock and may perform the read access, as in 230, before continuing to execute the transaction, as indicated by the feedback loop to 210.

According to the illustrated embodiment, if the thread attempts to obtain the write-lock portion of the read-write lock, as in 235, it may not do so if another thread already holds the write-lock portion of the lock, as indicated by the affirmative exit from 240. However, if no other thread holds the write-lock, as indicated by the negative exit from 240, the thread may wait for all readers (i.e., threads holding the read-lock on the shared memory area) to release their read-locks, as in 245 before performing the write access, as in 250, and continuing to execute the transaction, as indicated by the feedback loop to 210.

Once all locks have been acquired and/or all memory access operations have been performed, as indicated by the negative exit from 210, the thread may complete the transaction, as in 255. It should be noted that although the illustrated embodiment executes write operations as they are encountered, as in 250, in other embodiments, the write operations may instead be performed during transaction completion phase 255. A more thorough discussion of these options appears below with respect to redo and undo logging.

Figure 3:
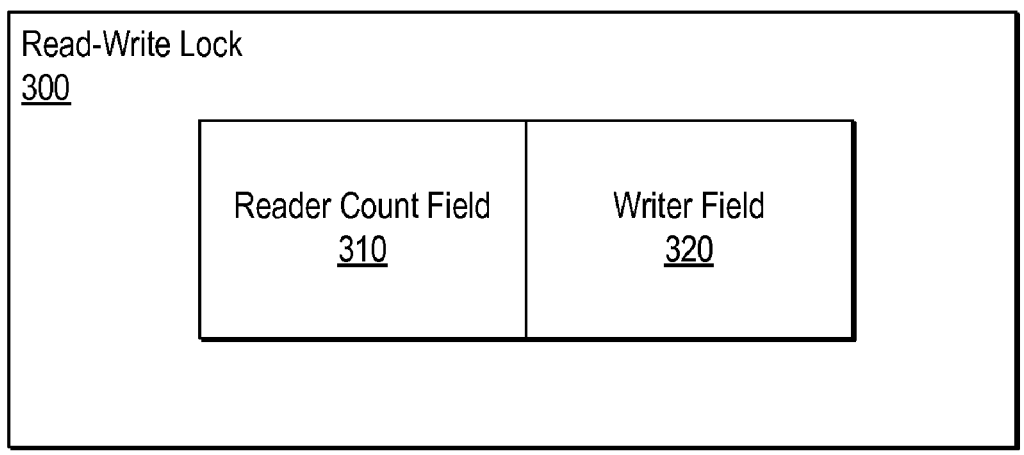
FIG. 3 is a flow diagram illustrating a method for implementing transactional locking using read-write locks, according to one embodiment.

FIG. 3 illustrates an example of a read-write lock, according to one embodiment. In FIG. 3, read-write lock 300 may be implemented as a single lock word, which may comprise at least two fields, such as reader count field 310 and writer field 320, indicating the existence of active readers and active writers respectively. In some embodiments, reader count field 310 may comprise any number of bits, which may be used to hold a value indicating the number of readers holding the lock (i.e., threads that hold the lock for read-permissions). In some embodiments, writer field 320 may comprise one or more bits, which may hold a value that indicates whether the lock is held by a writer (i.e., a thread that holds the lock for write-permission). In various embodiments, the value(s) in writer field 320 may identify the thread that holds the write-lock, while in others the field may simply indicate that a writer holds the write-lock without identifying the writer.

FIG. 4a is a flowchart illustrating a method for reading values from a stripe associated with a read-write lock such as 300, according to one embodiment. The illustrated method may be performed by a thread in a transactional memory system as part of executing a transaction, according to various embodiments. According to the illustrated embodiment, before reading a stripe, a thread may first determine whether the stripe's associated write-lock is held by another thread, as in 400. For example, the thread may determine whether writer field 320 indicates that a writer is holding the write-lock. While the write-lock is held, the thread may not acquire a read-lock, as indicated by the feedback loop of 400.

According to the illustrated embodiment, once the thread determines that the write-lock is no longer held, as indicated by the negative exit from 400, it may attempt to acquire a read-lock. For example, the thread may attempt to acquire a read-lock by incrementing reader-count field 310, as in 402. In various embodiments, any number of threads may concurrently hold a read lock associated with a given stripe.

According to the illustrated embodiment, after incrementing the reader-count field, the thread may check again to determine whether the write-lock has been acquired, as in 404. In some embodiments, this second check may determine whether another thread has acquired a write-lock on the stripe in the interval of time between when the thread determined that no thread held the write-lock (as in the negative exit from 400) and when the thread incremented the reader-count field (as in 402).

If the thread determines that another thread holds the write-lock, as indicated by the affirmative exit from 404, then according to the illustrated embodiment, the thread may decrement the reader count field, as in 406, and again wait for the write-lock to be released, as in 400. However, if the thread determines that the write-lock is not held, as indicated by the negative exit from 404, the thread has acquired the read-lock on the stripe.

After acquiring a read-lock on a stripe, the thread may read the stripe value as in 408 and perform any number of other operations in the transaction before releasing the read-lock. In embodiments that utilize read-write locks such as 300, releasing the read-lock may comprise decrementing reader count field 310, as in 410.

FIG. 4b is a flowchart illustrating a method for writing values to a stripe associated with a read-write lock, according to one embodiment. The illustrated method may be performed by a thread in a transactional memory system as part of executing a transaction using read-write locks, according to various embodiments. According to the illustrated embodiment, before modifying a value in a stripe, a thread may first determine whether any readers currently hold the stripe's associated read-lock, as in 420. For example, in embodiments that utilize read-write locks such as 300 of FIG. 3, the thread may determine whether reader count field 310 indicates that any readers are holding the associated read-lock. While one or more readers hold the read-lock, the thread may not acquire the write-lock, as indicated by the feedback loop of 420. Instead, the potential writer thread may wait for the readers to "drain" before acquiring the write lock.

According to the illustrated embodiment, the thread may also determine if any other threads are holding the stripe's associated write-lock, as in 425. This determination may be performed before, after, or concurrently with decision 420 (determining whether a read lock is held by another thread). This decision is analogous to that of 400 described above.

In some embodiments, if the thread determines that another thread is currently holding the write lock, as indicated by the affirmative exit from 425, it may wait until the write lock is released. Once no read locks are held and the write-lock is not held, as indicated by the negative exit from 425, the thread may acquire the write lock, such as by setting writer field 420 to a value indicating that the lock is held, as in 430.

After acquiring the write-lock on a stripe, the thread may modify one or more values contained in the stripe as in 435 and perform any number of other operations in the transaction before releasing the write-lock. In embodiments that utilize read-write locks such as 300, releasing the write-lock may comprise setting writer field 320 to a value that signals that the write lock is not held, as in 440.

According to various embodiments, read-write locks may be used to implement transactional memory. Such techniques may be referred to herein as transactional locking with read-write locks (TLRW). In some embodiments, to execute an atomic block as a transaction, a transactional memory system may transparently acquire/release the necessary read and/or write locks on memory stripes operated on by the block. Although many of the examples below describe a thread acquiring and/or releasing locks, it should be understood that in some embodiments, the TLRW system itself may be performing the acquiring and/or releasing of locks on behalf of the thread.

In some embodiments, if a thread executing transactionally is unable to acquire a needed lock, the transaction may be aborted and retried. For example, if a thread executing transactionally requires a read-lock on a given memory stripe but a writer is holding a write-lock on the stripe, the reader thread may have to wait, as illustrated by the feedback loop of 400 in FIG. 4*a*. In some embodiments, this waiting may be implemented as a bounded spin, wherein if the thread is unable to acquire the lock within a given period of time, the transaction may be aborted and retried. In some embodiments, after spinning for a given period of time, a thread may be configured to check for cycles in a graph representing which threads are waiting for which locks (i.e., dependence graph). In some such embodiments, if a cycle exists in this graph, then at least one of the threads in the cycle may abort and otherwise, if no cycle exists, one or more waiting threads may continue to spin. In other embodiments, local spinning, queues, and/or other techniques may be used.

In various embodiments of TLRW, transactions may be executed using either redo logging or undo logging. In some embodiments with redo logging, a thread may execute a transaction speculatively by performing write operations to a thread-local speculative store buffer rather than to shared memory. Since these speculative writes are not being committed to shared memory, the speculative phase may execute without acquiring the appropriate write-locks. To perform read operations during this speculative execution phase, the thread may try to retrieve the target memory value from the speculative store buffer. If the store buffer does not contain the memory value, then the thread may attempt to acquire the appropriate read-lock(s) before reading the corresponding values from shared memory.

In embodiments of TLRW with redo logging, at commit time (i.e., end of the transaction), the thread may attempt to write the values in the speculative store buffer to memory (i.e., perform a write-back) by acquiring the necessary write-locks and storing the speculative values in the buffer to shared memory. For example, according to some embodiments, the thread may acquire all necessary write-locks and then store all of the speculative values in the store buffer to shared memory. If the write-back is successful, the thread may then release the read and write-locks it acquired for the transaction.

In some embodiments, TLRW with redo logging (or undo logging as described below) may provide implicit privatization by holding all read-locks until after successfully completing the write-back step. In other embodiments, the read-locks may be released after acquiring the write-locks and before performing the write back. While releasing the read-locks before the write-back step may cause the TLRW system to not provide implicit privatization, the technique may confer some performance benefits since it may allow read-locks to be held for shorter periods.

Figure 5:
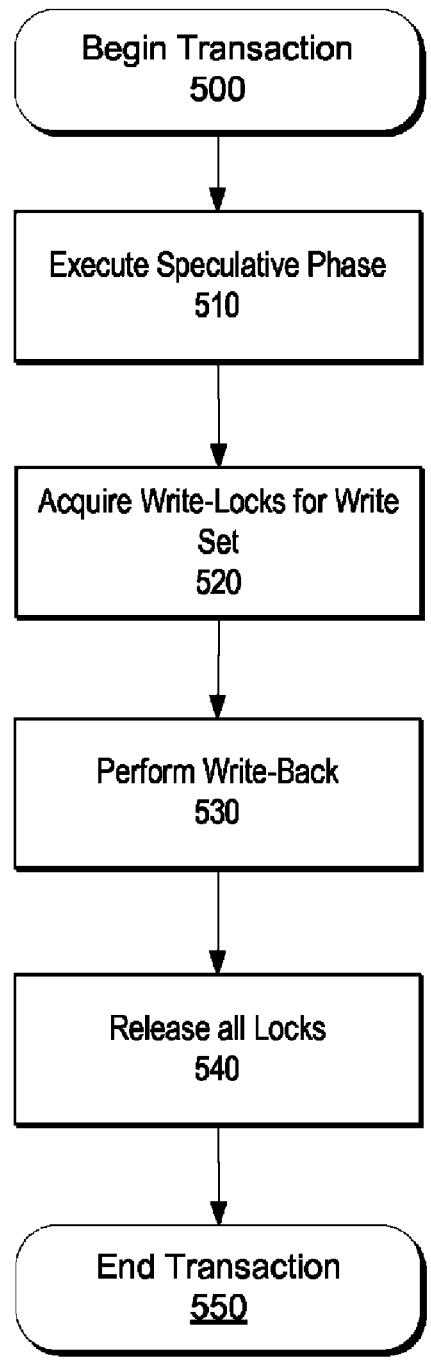
FIG. 5 is a flow diagram illustrating a method for executing transactional locking with read-write locks (TLRW) with redo logging, according to one embodiment.

FIG. 5 is a flow chart illustrating a method for performing a transaction using TLRW with redo logging, according to one embodiment. In the illustrated embodiment, a thread may begin executing an atomic block as a transaction, as in 500. The thread may execute the transaction body in speculative execution phase 510, as described above. To perform read from a shared memory location during speculative execution phase 510, the thread may first acquire a read-lock for that shared memory location, such as by executing the method of FIG. 4*b*. However, to the thread may be configured to perform store operations to a local speculative store buffer without acquiring write-locks, as described above.

According to the illustrated embodiment of FIG. 5, after performing speculative execution phase 510, the thread may attempt, as in 520, to acquire necessary write-locks for performing the write-back of the speculative store buffer. In some embodiments, the acquisition of each write-lock may be performed using a method substantially similar or identical to that of FIG. 4*b*. If the thread is able to acquire all of the write-locks in 520, it may then perform the write-back operation as in 530. The thread may then release the read and write locks acquired in phases 510-420, as in 540, and close the transaction, as in 550.

In various embodiments, the thread may abort its transactional attempt if it fails to acquire a needed lock. For example, assume that during 520, the thread attempts to acquire a write-lock on a given stripe, but is forced to wait due to one or more other threads concurrently holding read or write locks on the stripe. In embodiments wherein the thread is configured to wait using a bounded spin, a sufficiently long delay may cause the thread to abort the transaction and reattempt execution, such as by releasing its locks and returning to phase 500. In various embodiments, such timeout policies may be used to avoid deadlock among concurrently executing threads.

In various embodiments, different mechanisms may be deployed for avoiding thread starvation. For example, in some embodiments, a writer (i.e., thread attempting to acquire a write-lock) may request that readers desist and drain, such as by setting a drain indicator bit in the read-write lock. In such embodiments, after a potentially starving writer sets such a bit, subsequently arriving reader threads may defer incrementing the reader count field. For example, readers may defer incrementing the reader count until it reaches zero (indicating that the writer has had a fair chance to acquire the write lock). In other embodiments, a potential reader thread may defer until the writer has cleared the drain indicator, which the writer may do after acquiring and then releasing the lock. In other embodiments, the writer may implicitly signal for potential readers to drain by setting the write field of the read-write lock to a given value (e.g., indicating write-lock is held) and then wait for the reader count to reach zero before proceeding. According to the protocols above, readers arriving after the write field has been modified would stall and/or abort. In such an embodiment, readers may still decrement the reader count field when releasing the read-lock.

In some embodiments of TLRW, a transaction may be executed using undo logging instead of redo logging. In TLRW with undo logging, rather than using a speculative store buffer, a thread may acquire write locks during the speculative execution phase of a transaction as needed and only "roll back" these stores in the case of an abort.

In embodiments utilizing undo logging, transactional stores may require the executing thread to acquire a write-lock on the target stripe, save the existing value of the memory location (e.g., in a thread-local undo log), and then store the new value to the target shared memory location. In the case of a transactional abort (e.g., timeout due to failure to acquire a needed lock as described above), the TLRW system may restore the original values from the undo log to memory and release acquired write-locks In various embodiments, the decision to use undo or redo logging may be made statically by the program author or dynamically by the TLRW system. For example, the TLRW system may opt to use undo logging when the conflict rate on the needed read-write locks is known to be low.

In some embodiments, a hybrid approach may be used wherein some threads use redo logging while others use undo logging. Both undo and redo logging may provide implicit privatization and coexist and interoperate safely. In some embodiments, a given transaction attempt may itself use mixed redo and undo logging. For example, if a transaction using undo logging, but a transactional store encounters a stripe that is locked in a conflicting manner, in some embodiments, the transaction may proceed by using redo logging for such conflicting stripes, thereby potentially allowing more parallelism.

According to various embodiments, different types of read-write locks may be used to implement TLRW. For example, in some embodiments, read-write locks such as 300 of FIG. 3 may be used. In one such embodiment, read-write lock 300 may be implemented as a single lock word. In such embodiments, the acquisition or release of a read or write lock (e.g., methods of FIGS. 4a and 4b) may be accomplished with a single atomic compare and swap (CAS) operation. For example, to acquire a read-lock, the CAS operation may read the entire read-write lock 300, compare the writer field 320 to a value that would indicate the write-lock is not held, and if the writer field contains that value, increment the reader count field 310 to acquire the read-lock.

In other embodiments, reader count field 310 and writer field 320 may be individually addressable words. In one such embodiment, to acquire a read-lock, a reader may increment the reader count field and then check the writer field repeatedly until its value indicates that is no longer held before proceeding. In embodiments where such an instruction is available, a reader may use an atomic fetch-and-add instruction instead of a CAS to increment the reader-count word.

To acquire a write-lock in an embodiment with individually addressable reader count and writer fields, a thread may use a CAS operation to modify the writer field to indicate that the thread is holding the write lock and then wait for any readers to drain before proceeding. In such an embodiment, the CAS operation may be used to ensure that the thread only acquires the write lock if the write lock is not already held by another thread. Waiting for readers to drain may comprise repeatedly observing the reader count field until zero readers are observed.

In embodiments with single reader count field (e.g., read-write lock 300), contention may arise when multiple readers attempt to increment and/or decrement the reader count field. In alternate embodiments, reader count field 310 may be broken into two fields: a reader count increment (RCI) field and a reader count decrement (RCD) field. In such an embodiment, acquiring a read-lock may comprise incrementing the RCI field. Releasing the read-lock may comprise incrementing the RCD field. Thus, the total number of readers in such a system may be calculated as RCI minus RCD. In such embodiments, writers may determine whether any readers exist by comparing the values of the RCI and RCD fields before acquiring the write-lock. For example, according to one such embodiment, a writer may use a CAS operation to install itself into the writer field and then wait for RCI minus RCD to equal zero, a condition that may indicate that no readers hold the write lock. Once the number of readers reaches zero, the writer has successfully acquired the lock and may proceed with its transaction. In various embodiments, other variations of the reader count field may be used to decrease contention. For example, in some embodiments, scalable non-zero indicators, such as those described in U.S. Patent Publication 2009/0125548, may be used.

In some embodiments, TLRW may be implemented with read-write locks with named readers, that is, read-write locks wherein the reader count field (e.g., 310) may comprise a value indicating that a single reader holds the read-lock. For example, in such an embodiment, the identity of the reader (named reader) may be encoded into the reader count field 310 if the reader is the only one holding the lock. In such embodiments, if a reader determines that no other reader holds a given read-lock, rather than simply incrementing the reader count, the reader may insert a value identifying itself into the reader count field.

In such embodiments, the single reader state may be exited by the reader itself (e.g., by releasing the read-lock) or by another thread (e.g., by acquiring the read lock). In some embodiments, to cause a lock to exit the single reader state, a thread may be required to first acquire a dedicated mutual exclusion lock uniquely associated with the reader thread and then modify the read-write lock to perform the release.

This technique may confer a number of advantages. For instance, a reader may be able to quickly detect whether it already holds a read-lock over a given stripe. Additionally, when the named reader releases the lock, it may do so with a normal store operation rather than with a more expensive CAS operation since it holds its own mutual exclusion lock and is the only one that may modify the read-write lock.

Figure 6:
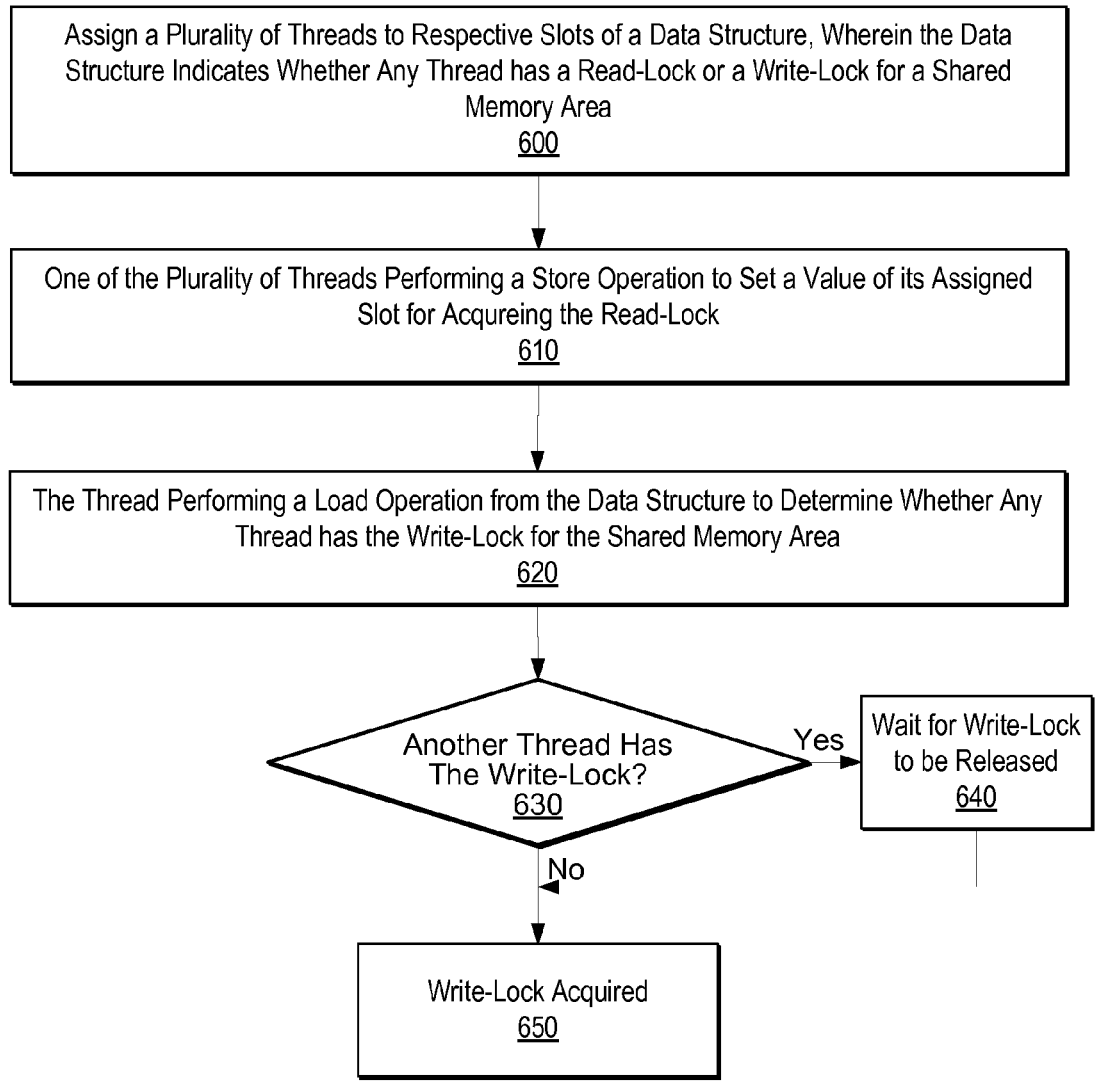
FIG. 6 is a flow diagram illustrating a method for using slotted read-write locks for controlling concurrent access to a shared memory area, according to some embodiments.

In some embodiments, TLRW may be implemented with slotted read-write locks, for example, as shown in FIG. 6. FIG. 6 is a flow diagram illustrating a method for implementing transactional locking using slotted read-write locks, according to one embodiment. A slotted read-write lock may contain some number of slots, which may each be assigned to a respective thread, as in 600. In order to acquire the slotted read-write lock for reading, a thread may perform a store operation to set a value of its assigned slot for acquiring the read-lock, as in 610. In some embodiments, the store operation used to set the value of the assigned slot must be atomic with respect to other memory operations (e.g., atomic byte stores as in x86, SPARC, etc).

According to the illustrated embodiment of FIG. 6, the thread may then determine whether another thread holds the slotted read-write lock for writing, such as by performing a load operation from the lock, as in 620. If another thread already holds the write-lock, as indicated by the affirmative exit from 630, the thread may have to wait for the write-lock to be released, as in 640, before it may acquire the read-lock, as in 650. However, if no other thread holds the write-lock, as indicated by the negative exit from 630, the thread may acquire the read-lock, as in 650.

Figure 7:
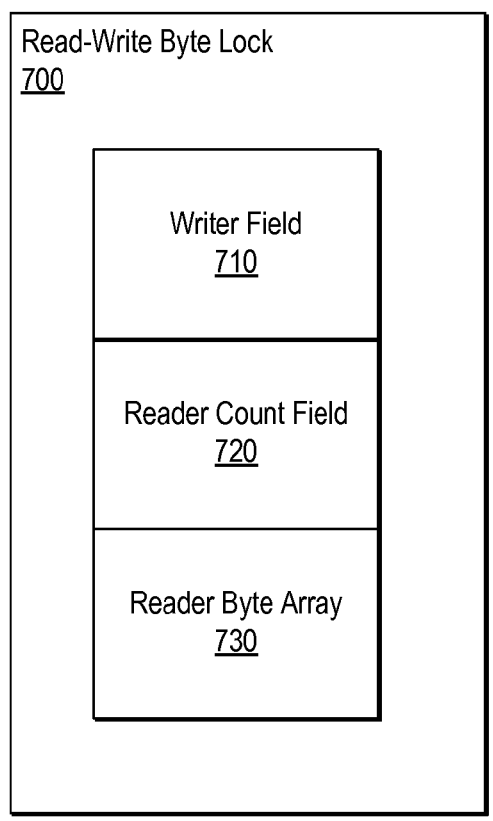
FIG. 7 is a block diagram illustrating a read-write byte lock, according to one embodiment.

FIG. 7 is a block diagram illustrating a slotted read-write lock, according to some embodiments. In the illustrated embodiment, slotted read-write lock 700 comprises writer field 710, reader count field 720, and reader byte array 730. In some embodiments, writer field 710 may be analogous to writer field 320 of FIG. 3. For example, in order for a writer thread to acquire a slotted read-write lock 700 for writing, a locking protocol may dictate that the thread must store a value (e.g., one identifying the thread) into writer field 710. For clarity of explanation, in the embodiments described below, the writer field contains either a thread identifier value, which identifies a single thread, or a NULL value, which identifies no threads.

In some embodiments, reader count field 720 may be analogous to reader count field 310 of FIG. 3. For example, reader count field 720 may comprise an atomically accessible word that may be used to reflect the number of active readers holding slotted read-write lock 700 for reading. In various embodiments, any of the read-write lock variations described above may be applied to slotted read-write lock 700. For example, in some embodiments, reader count field 720 may be decomposed into separate RCI and RCD fields, as described above. In another example, slotted read-write lock 700 may implement named readers, as described above. Other variations of read-write locks may also apply to slotted read-write lock 700.

In some embodiments, slotted read-write lock 700 may comprise one or more fields, such as reader byte array 730, that identify one or more readers. In some embodiments, reader byte array 730 may comprise an array of individual atomically addressable reader bytes. In such embodiments, each reader byte may be associated with at most one reader thread at any given time. For example, in one embodiment, threads accessing the slotted read-write lock may be either "slotted" or "unslotted", such that slotted threads are associated with a unique index (slot) in reader byte array 730 while unslotted threads are not. In such embodiments, at most one slotted thread may be associated with a given index.

In some embodiments, unslotted readers may acquire a read-lock as before. For example, in embodiments wherein writer field 710 and reader count field 720 are implemented as a single lock word, a method such as that of FIG. 4*a* may be used. In other embodiments, wherein 710 and 720 are individually addressable, a modified method may be used such that successfully acquiring the lock may comprise determining that the write-lock is not held after incrementing the reader count.

Figure 8:
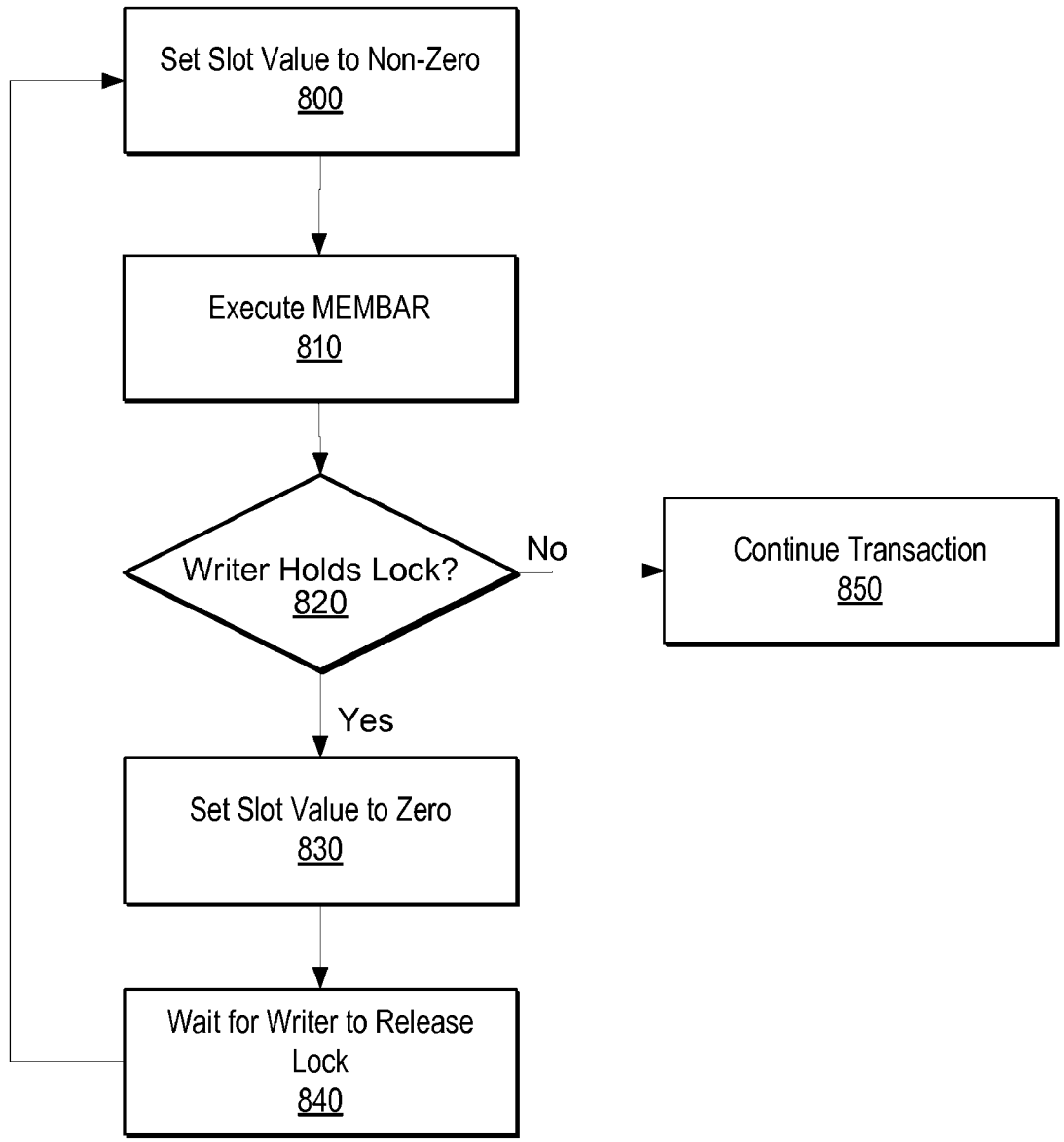
FIG. 8 is a flow diagram illustrating a method for acquiring a slotted read-write lock for reading, according to one embodiment.

In various embodiments, slotted readers may acquire read-locks according to a method such as that illustrated by the flow diagram of FIG. 8. According to the embodiment of FIG. 8, a slotted reader may attempt to acquire a read-lock for a given stripe by first inserting an appropriate value (e.g., a non-zero value) into the reader's corresponding slot, as in 800. In such embodiments, since the reader is the only thread that may modify the value contained in its slot, the thread need not use an atomic instruction, such as a CAS, to perform the modification of 800. Rather, in some embodiments, the reader thread may use a normal memory write operation to modify its slot value. In some embodiments, executing such a normal memory write operation may consume less time and/or fewer computing resources than would executing a more computationally expensive atomic operation, such as a CAS. For example, unlike a CAS operation, a normal store operation could not fail and require re-execution. Furthermore, slotted readers may avoid various latency and cache invalidation issues that may result from the performance of a CAS operation. Thus, according to various embodiments, slotted readers using slotted read-write locks may enjoy a performance benefit over unslotted readers and/or those using other types of read-write locks.

In some embodiments, such as those wherein out-of-order execution is supported, the reader thread may then execute a memory barrier (MEMBAR) operation, as in 810, to ensure that the new value is globally visible to all threads. As used herein, the term MEMBAR may refer to one or more instructions that, when executed by a thread, ensures that the results of all store operations of the thread that are before the MEMBAR in program order are visible to all threads, including the executing thread. For example, if a given thread stores a first value to first memory location, then executes a MEMBAR followed by a load operation, then the MEMBAR operation ensures that the first value is visible to (i.e., readable by) all threads in the system before the load operation is executed. In some embodiments where out-of-order processing is utilized, memory access operations that are subsequent to a MEMBAR operation in program order may not be reordered to execute before the MEMBAR operation.

According to the illustrated embodiment of FIG. 8, after executing the MEMBAR operation in 810, a reader thread may determine whether a writer currently holds the slotted read-write lock for writing, as in 820, such as by reading the value of writer field 710 and determining if it is NULL. If the write lock is not held, as indicated by the negative exit from 820, the reader has successfully acquired the read-lock, and may continue to execute its transaction, as in 850. However, if the write-lock is held by another thread, then the reader has not successfully acquired the read-lock.

According to the illustrated embodiment, if the reader determines that the write-lock is held, as indicated by the affirmative exit from 820, the reader may clear the value in its slot, such as by setting the slot value to zero as in 830. The reader may then wait for the writer to release the write-lock, as in 840, such as by repeatedly polling writer field 710 until an appropriate value (e.g., NULL) is observed. According to the illustrated embodiment, once the write lock is released, the writer may reattempt to acquire the read-lock, as indicated by the feedback loop from 840 to 800. After acquiring a read-lock, the slotted reader may release the read-lock by clearing its corresponding slot, such as by setting its slot value to zero.

Figure 9:
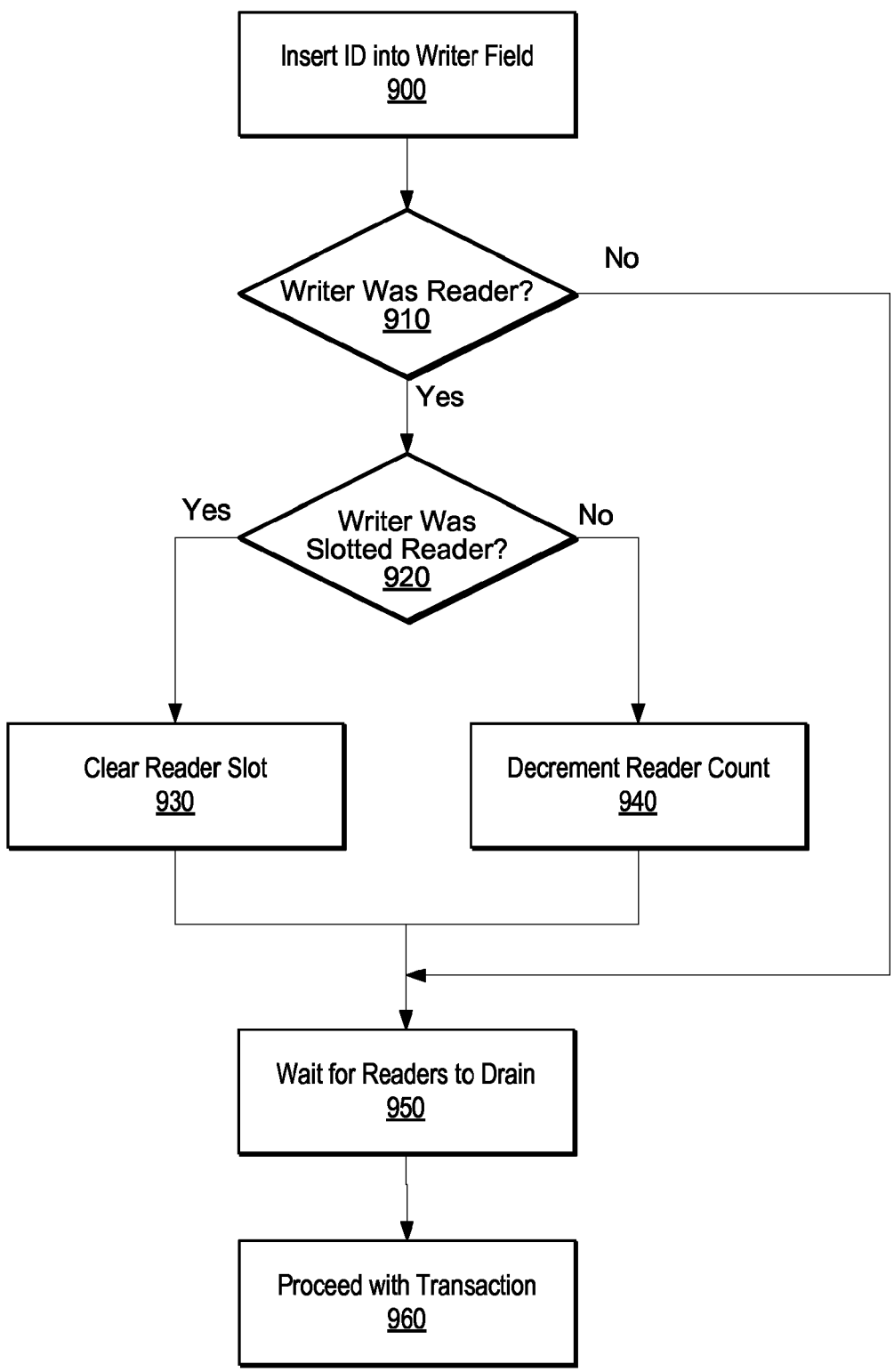
FIG. 9 is a flow diagram illustrating a method for acquiring a read-write byte lock for writing, according to one embodiment.

In some embodiments of TLRW with slotted read-write locks, a thread may acquire a write lock according to the method illustrated by FIG. 9. According to the illustrated embodiment, a thread may first attempt to modify the value of writer field 710 (as in 900), such as by repeatedly performing a CAS operation to install an identifier associated with the writer thread (i.e., a thread identifier) into the writer field. In some embodiments, a thread may only modify the value in the writer field if the write-lock is not already held by another thread. For example, in one embodiment, a writer may only modify the value of the writer field if the current value is NULL.

According to the illustrated embodiment, once the writer has installed its identifier into the writer field of the byte-lock, the writer may determine if it holds a read-lock, as in 910. If the thread does hold a read-lock, as indicated by the affirmative exit from 910, then it may release the read lock. According to the illustrated embodiment, if the writer is a slotted reader, as indicated by the affirmative exit from 920, it may release its read-lock by clearing its respective reader slot, as in 930. If the writer is an unslotted reader, as indicated by the negative exit from 920, then it may release its read-lock, such as by decrementing the reader count, as in 940.

According to the illustrated embodiment, once the writer thread no longer holds a read-lock on the stripe (either because it released it as in 930/940 or because it did not hold the read-lock at the start of the method, as in the negative exit from 910), the thread may wait for all other readers to drain, as in 950. That is, the thread may wait until it can determine that no readers are holding the slotted read-write lock for reading before proceeding. In some embodiments, the writer may determine this by observing that reader count field 720 is zero and that reader byte array 730 contains only zero values.

In some embodiments, the thread may reduce the number of memory operations needed to perform this check by fetching the values of multiple slots in a single memory operation, such as by using full-word loads (e.g., loading 8-byte words). In embodiments wherein SIMD programming is supported (e.g., XMM, x86, SPARC, etc.), writers may use even wider load operations to scan reader byte array 730 for readers. In some embodiments, the writer thread may fetch the full reader byte array 730 and determine whether the value is zero, which, in some embodiments, may indicate that no readers hold the slotted read-write lock for reading. In some embodiments, the number of slots in the slotted read-write lock may be chosen based, at least in part, on the architecture of the deployment machine. For example, in one embodiment, the number of slots may be chosen so that all the slotted read-write lock fields fit into a single cache line. Once all of the read-locks are released (i.e., all the readers have drained), the thread has acquired the write lock and may proceed with its transaction, as in 960.

The embodiment described above, if a writer is waiting for readers to drain and a new reader attempts to acquire the byte-lock for reading, then that reader defers to the writer. That is, the prospective reader may need to wait for the writer to acquire and release the byte-lock for writing before it may acquire it for reading.

In various embodiments, different policies may be used for assigning slots to threads. For example, in one embodiment, when a thread is created, it may be assigned a slot from a pool of available slots. In other embodiments, a slot may be assigned to a thread upon the thread's first attempt to acquire a lock. In embodiments wherein a unique slot is assigned to each slotted thread, the thread may attempt to use the same assigned slot for all read-lock acquisitions during the thread's lifetime. In some embodiments, when the thread dies, its slot may be returned to a pool of available slots to be assigned to new threads as needed.

In other embodiments, other slot allocation policies may be possible. For example, in one embodiment, a thread may attempt to dynamically allocate a slot from a central pool or set of pools at the start of a transaction and voluntarily return the slot to the pool when the transaction completes. In such an embodiment, if no slot is available, the thread may execute in unslotted mode. In various embodiments, a pool of slots may be implemented as a lock-free stack or other data structure.

In some embodiments, multiple slot pools may be used. For example, in one embodiment, a different pool may be created and dedicated for each NUMA node, board, or die, etc. Using multiple slot pools may diffuse contention and/or reduce memory interconnect traffic.

In some embodiments, a thread may receive a "lease" on a slot rather than ownership. For example, holding a lease on a given slot may grant a thread the right to use the slot for some interval. In some embodiments, after the interval has elapsed, the thread may either return the slot to the pool or renew its lease. In some embodiments, the lease interval may vary dynamically, such as based on demand for and/or availability of slots.

In other embodiments, a thread may establish affinity to a preferred slot, such as the slot last used by the thread. In such embodiments, a thread may be able to quickly and efficiently acquire/release its preferred slot on-demand. For instance, in one embodiment, a thread may examine a record associated with its preferred slot and use a CAS instruction to exclusively claim (reclaim) that slot if the slot is not already in use. In further embodiments, the CAS operation may be eliminated by applying biased locking techniques, as are known in the art. This approach of trying to reclaim and reuse slots may reduce conflicts and updates to centralized structures as might be found in the case of a simple lock-free list or stack.

In some embodiments with preferred slots, if the preferred slot is unavailable, the thread may then try to scan the slot pool to find a new slot and may potentially take a slot that was another thread's preferred slot. The new slot may become the thread's new preferred slot. In some embodiments, after a bounded amount of time scanning the pool, the thread may abandon trying to allocate a slot and revert to executing the transaction in unslotted execution mode.

In some embodiments, if a thread is preempted by the operating system in the midst of a slotted transaction, the thread may be configured to run a special routine (e.g., an "OFFPROC" routine), surrendering its slot to the pool and aborting its active transaction. In some embodiments, the thread may attempt to defer preemption (e.g., by using the Solaris "schedctl" facility) until it has completed an active transaction. In some such embodiments, the thread may then voluntarily surrender its slot. In some embodiments, if a slotted thread executing a transaction is preempted before completing its transaction, the replacement thread may be configured to, before attempting its own transaction using the slot, detect that a previous thread was using the same slot and had not finished its transaction. In response to detecting such a scenario, in some embodiments, the replacement thread may transiently surrender the processor back to the original thread (e.g., using a "directed yield"), thereby allowing the first thread to complete its transaction.

In some embodiments, the CPUID of the processor on which a thread executes may be used as its slot index. In some embodiments with a sufficiently sized reader array, all currently executing threads could be slotted. In some embodiments, each thread may be notified (e.g., using a preemption callback) that it had been preempted, in which case, the thread may self-abort any transaction it may have had in-flight at the time of pre-emption. In other embodiments, if a first thread is pre-empted while executing a transaction, the replacement thread may be configured to detect this and perform the abort for the first thread. Aborting for the first thread may include releasing the locks held by the first thread and marking the first thread as having been asynchronously aborted. In such embodiments, the replacement thread may then use the slot of the first thread. In some such embodiments, when the first thread eventually resumes execution, it may consider the preempted transaction to have been aborted.

In some embodiments, the transactional memory system may be configured to allow irrevocable transactions. As used herein, the term irrevocable transaction may refer to a transaction that cannot be forced to abort due to contention with other threads. For example, in one embodiment, the transactional memory system may allow at most one thread at a time to become irrevocable, such as by allowing it to execute a transaction using an unbounded spin. In such an embodiment, other threads may still use a bounded spin, and thus, if contention arises, other threads will eventually yield to the irrevocable thread.

In various embodiments, the transactional memory system may switch a thread to irrevocable mode for various reasons. For example, if a thread is to execute a transaction that cannot be aborted (e.g., one that performs an I/O operation), then the transactional memory system may allow the executing thread to proceed with the transaction in irrevocable mode. In another example, irrevocable mode may be used to ensure eventual progress, such for a thread that has repeatedly failed to execute a given transaction.

In various embodiments, the transactional memory system may automatically and/or dynamically switch transactional attempts into or out of irrevocable mode. Such a decision may be based on various criteria, such as the transaction length, the number of futile cycles consumed, the number of prior aborts for the transaction, etc. In some embodiments, a thread may explicitly request irrevocability at the start of a transactional attempt. In some implementations, a thread that requests irrevocability may stall waiting to become irrevocable. In other embodiments, the thread may attempt to conditionally become irrevocable in the midst of an active transaction. In such embodiments, the request may be denied by the system, for example, if it would cause potential deadlock.

As discussed above, TLRW with slotted read-write locks provides implicit and proxy privatization. Therefore, TLRW with slotted read-write locks facilitates the translation of existing lock-based code to transactional memory. This translation may be performed manually or automatically through a conversion program.

In some embodiments of TLRW, the acquisition and/or release of read and/or write locks may comprise performing one or more atomic update operations, such as CAS operations. However, in various embodiments, the system may achieve better performance by avoiding atomic update operations whenever possible. On many modern processors, atomic updates may incur a local latency penalty. In addition, atomic updates to shared memory may incur costs due to cache coherency traffic, such as that incurred by switching locally cached data into a writable (modified) state. Furthermore, in some systems, write-sharing may consume memory or coherence interconnect bus bandwidth, which may be a limited resource that is shared among processors. Moreover, atomic updates may fail due to intervening updates and need to be retried one or more times. Therefore, in some embodiments, it may be desirable to minimize the number of atomic updates and/or the number of store operations to shared metadata generated by transactional loads.

For example, in some embodiments of TLRW with slotted read-write locks, writers may attempt to acquire the write-lock using a CAS operation (i.e., an atomic update), to avoid race conditions among writers and/or to ensure that only one writer holds the write-lock at any given time. However, in some situations, if it is known that only one writer could be active during a given interval, a writer may avoid executing the CAS and instead, may acquire a write lock using a simple store operation. In such embodiments, the writer may execute an appropriate MEMBAR operation after installing itself in the writer field in order to acquire the write-lock.

Figure 10:
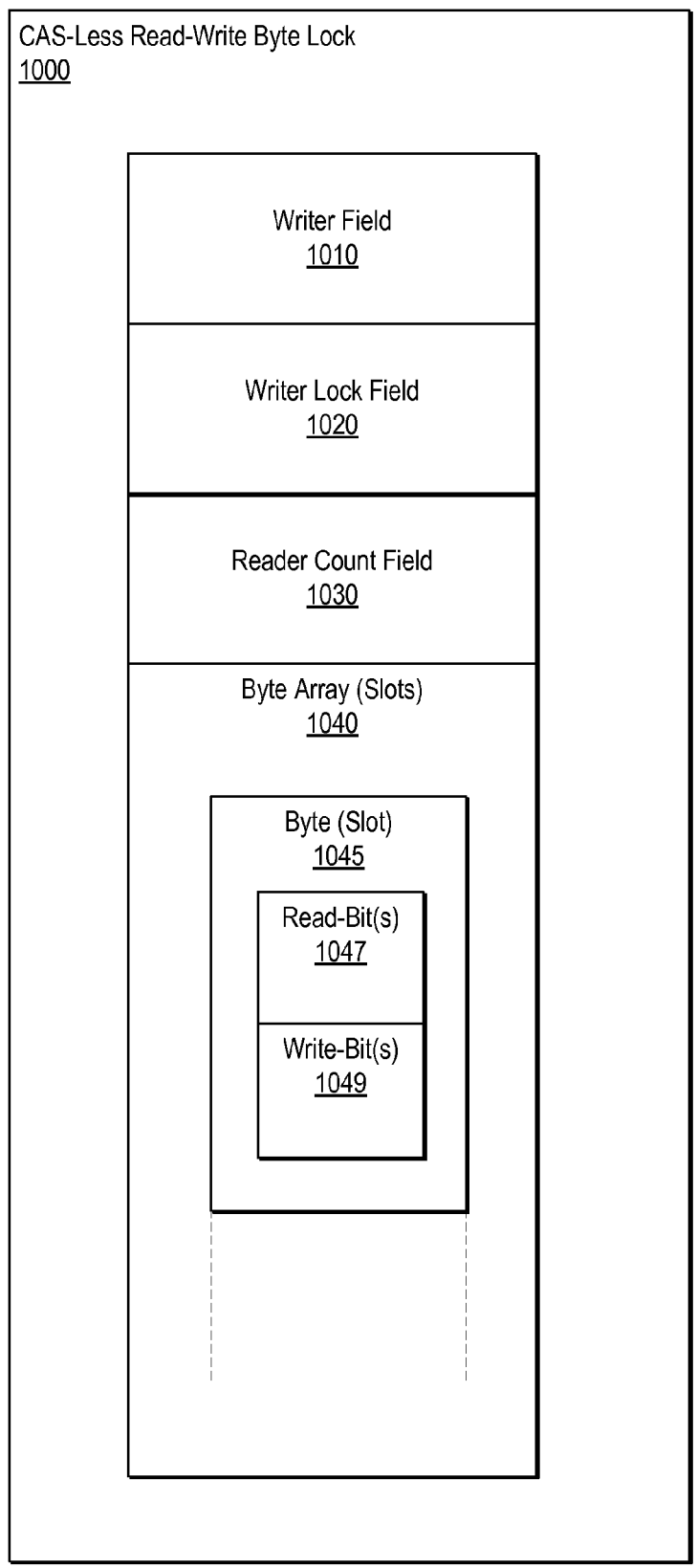
FIG. 10 is a block diagram illustrating a CAS-less read-write byte lock, according to one embodiment.

In other embodiments, TLRW may be implemented using a version of slotted read-write locks that may allow threads to acquire write-locks without performing atomic operations, such as CAS operations. Such locks may be referred to herein as CAS-less slotted read-write locks, though it should be understood that such locks obviate the need for performing any atomic operation, not only CAS operations. FIG. 10 is a block diagram illustrating a CAS-less slotted read-write lock, according to one embodiment. In the illustrated embodiment, CAS-less slotted read-write lock 1000 comprises a writer field 1010, which may indicate the identity of the thread that holds the lock for writing. This field may be analogous to writer field 710 in the previously described bye lock of FIG. 7. CAS-less slotted read-write lock 1000 may further comprise an atomically accessible writer lock field 1020, a reader count field 1030 (similar to reader count field 720 of FIG. 7), and a byte array 1040. In different embodiments, variations of the reader count field (e.g., RCI/RCD field) as described earlier may be used.

In some embodiments, byte array 1040 may comprise an array of individual, atomically addressable bytes (i.e., slots), such as 1045. Each byte 1045 may further comprise at least one bit indicating a read state (e.g., read-bit 1047) and at least one other bit indicating a write state (e.g., write-bit 1049).

To acquire a read-lock using a CAS-less slotted read-write lock such as 1000, according to various embodiments, slotted readers may perform an acquisition method analogous to that described above for acquiring regular slotted read-write locks (e.g., FIG. 8). However, instead of the reader modifying its entire slot's value (as in 800) for lock acquisition, a reader may modify only those bits in its slot that indicate a read state, such as read-bit 1047. Thus, according to some embodiments, a slotted thread may begin an attempt to acquire a CAS-less slotted read-write lock for read permissions by storing a non-zero value into the read-bit (e.g., 1047) of its respective slot (e.g., 1045) and executing a MEMBAR instruction to ensure that the store is a globally visible to other threads. According to this embodiment, the reader may then fetch the value of writer field 1010 and determine if the write-lock is being held (e.g., if writer field 1010 is not NULL then the write-lock may be held). If the write-lock is not held, then the reader has acquired the lock. Otherwise, the reader may store a zero value into read-bit 1047, wait for the writer to release the write lock, and reattempt acquisition. The method is analogous to that of FIG. 8, except that the reader operates on its slot's read-bit 1047 (e.g., in 800 and 830).

In some embodiments with CAS-less slotted read-write locks, unslotted readers may acquire read permissions by using a CAS to atomically increment reader count field 1030 and then fetch the value of writer field 1010. If the reader determines that writer field 1010 is NULL (i.e., the write-lock not held), then it has acquired the read-lock and may proceed with its transaction. Otherwise, the reader may decrement reader count field 1030 and wait for the writer to release the write-lock before trying again.

Figure 11:
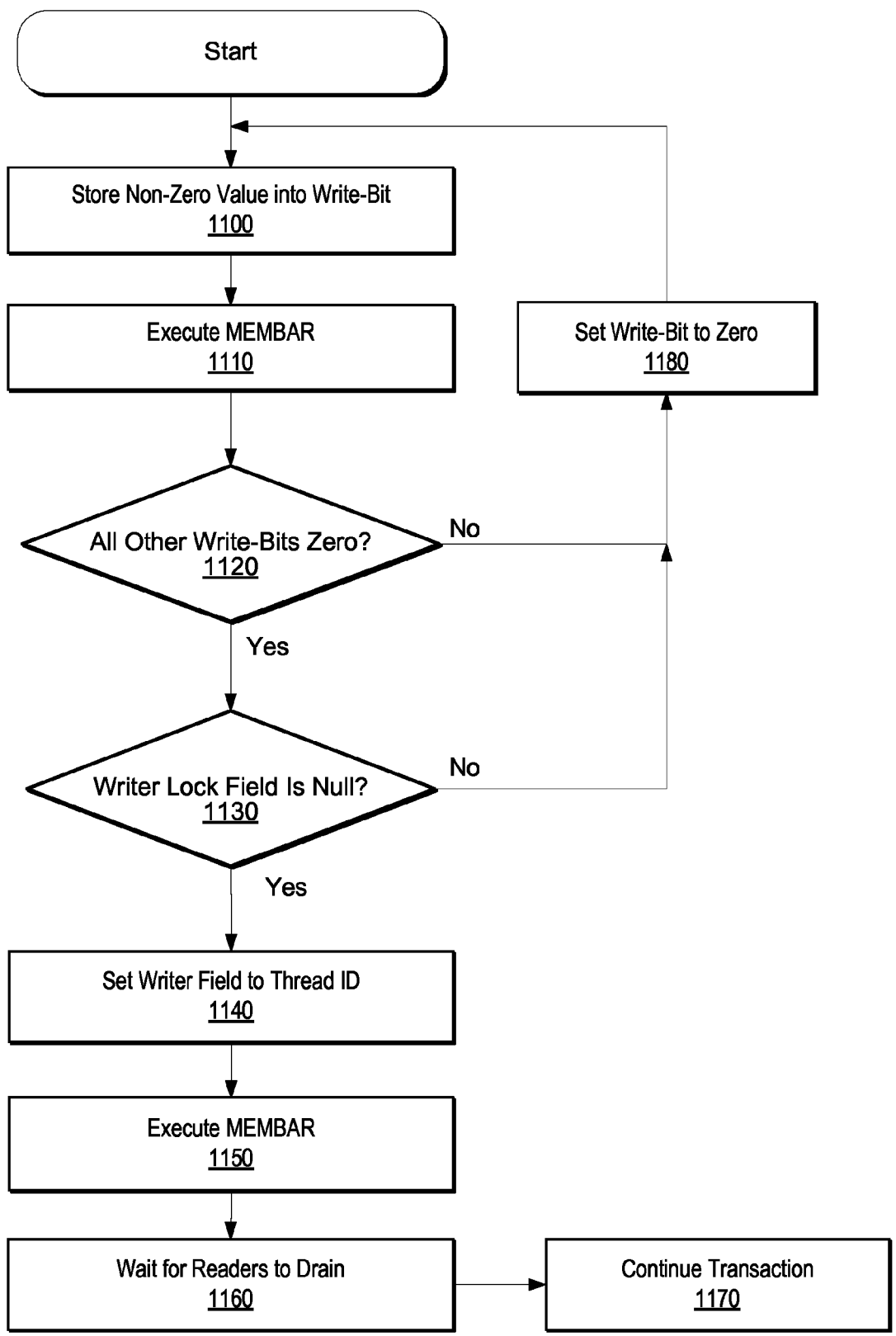
FIG. 11 is a flow diagram illustrating a method by which a slotted thread may acquire a CAS-less slotted read-write lock for write permissions, according to one embodiment.

FIG. 11 illustrates a method by which a slotted writer may acquire a CAS-less slotted read-write lock for write permissions, according to one embodiment. According to the illustrated embodiment, the slotted writer may begin the method by setting the write-bit of its slot (e.g., 1049 of 1045 in FIG. 10), such as by storing a non-zero value into it, as in 1100. Since the thread is writing to its own dedicated slot, in some embodiments, the thread may use a regular store instruction rather than an atomic one (e.g., CAS) for updating the write-bit, as in 1100. In some embodiments, the thread may execute a MEMBAR operation, as in 1110, to ensure that the new value is globally visible to all readers.

According to the illustrated embodiment, the thread may then determine whether another thread already holds the slotted read-write lock for writing. For example, if the write-bit of any other slot is set (e.g., non-zero) or if the writer lock field is set (e.g., non-NULL), as indicated by the negative exits from 1120 and 1130 respectively, then the thread may determine that the write-lock is already held by another thread. According to the illustrated embodiment, if the write-lock is held by another thread, the thread may unset its write-bit 1149, such as by setting it to zero as in 1180, and reattempt to acquire the write lock, as indicated by the feedback loop from 1180 to 1100. In various embodiments, a back-off scheme may be added to this retry mechanism. For example, in one embodiment, the thread may delay before reattempting to acquire the lock, wherein for each failed attempt, the thread delays for a longer interval.

According to the illustrated embodiment, if no other thread already holds the write-lock (e.g., the values of the write-bits for all other threads are zero and the value of writer lock field 1020 is NULL as indicated by the affirmative exit from 1120 and 1130 respectively), then the thread may store a value in writer field 1010 signifying that the thread holds the write-lock. For example, the thread may store a unique identifier associated with itself (as in 1140), execute a MEMBAR operation to ensure that the update is globally visible (as in 1150), and wait for all readers to drain (as in 1160). In some embodiments, waiting for all readers to drain may comprise waiting until reader count field 1030 is zero and the read-bits of every other slot are zero. According to the illustrated embodiment, once all readers have drained, the thread has successfully acquired the write-lock and may continue its transaction, as in 1170. To release the lock, the thread may later set writer field 1010 to NULL and the write-bit in its associated slot to zero.

In various embodiments, other variations on this ordering may be possible. For example, in one embodiment, the thread may determine if the value of writer field 1010 is NULL before modifying its write-bit, as in 1100.

Figure 12:
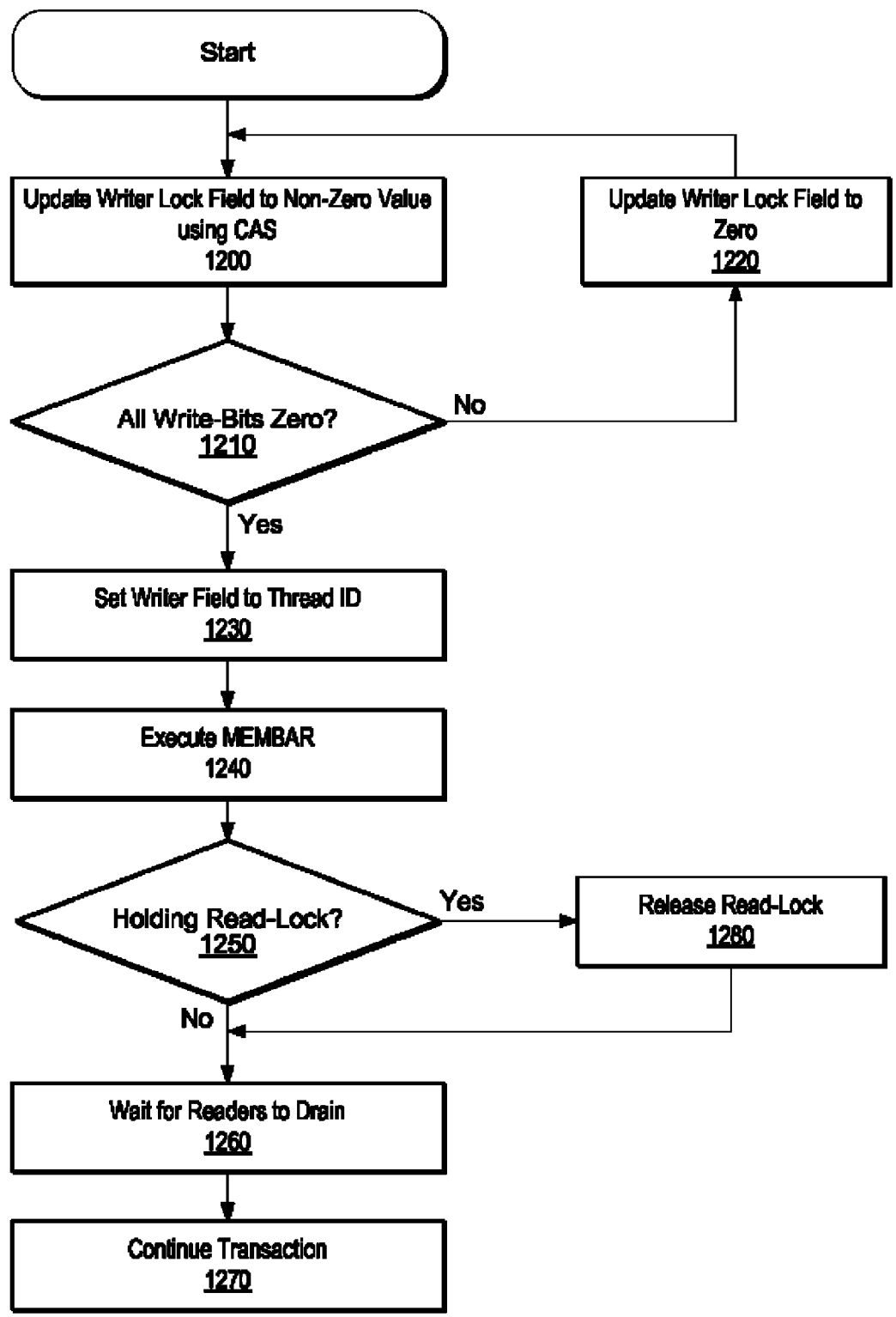
FIG. 12 is a flow diagram illustrating a method by which an unslotted thread may acquire a CAS-less slotted read-write lock for write permissions, according to one embodiment.

FIG. 12 illustrates a method by which an unslotted writer may acquire a CAS-less slotted read-write lock for write permissions, according to one embodiment. According to the illustrated embodiment, the slotted writer may begin the method by attempting to set the writer lock field, such as by modifying the value of writer lock field 1010 from zero to a non-zero value using a CAS operation, as in 1200. In various embodiments, different values may be used to signal that the writer lock field is set or unset.

After setting the writer lock, as in 1200, the thread may determine whether any other writers currently hold the slotted read-write lock for writing, such as by examining the write-bits of the slotted readers. If one or more of the write-bits are set (e.g., non-zero), then another thread may already hold the lock for writing, as indicated by the negative exit from 1210. According to the illustrated embodiment, if the write-bit of another thread is set (negative exit from 1210), the thread may unset the writer lock field (e.g., set the writer lock field to zero, as in 1220). The thread may then reattempt to acquire the write lock, as indicated by the feedback loop from 1220 to 1200.

According to the illustrated embodiment, if the thread determines that no write-bits of other threads are set (e.g., all write-bits are zero, as indicated by the affirmative exit from 1210), then the thread may set the writer field 1010 to a value identifying the thread, as in 1230). In some embodiments, setting the writer field as in 1230 may be performed using a normal store operation rather than an atomic update, such as a CAS. According to the illustrated embodiment, if a normal store operation is used, then the thread may execute a MEMBAR operation, as in 1240. The MEMBAR operation may ensure that the update to writer field 1010, performed in 1230, is globally visible to other threads.

According to the illustrated embodiment, the slotted thread may then determine whether it already holds the byte-lock for reading (i.e., holding the read-lock), as in 1250. In some embodiments, the thread may perform this check by determining if its corresponding read-bit (e.g., 1047) is set. In some embodiments, a read-bit may be set when it holds a non-zero value.

According to the illustrated embodiment of FIG. 12, if the thread is holding the read-lock, as indicated by the affirmative exit from 1250, then it may release the read-lock before proceeding, as in 1280. For example, in one embodiment, if the value of read-bit 1047 of the thread's corresponding slot is non-zero, then the thread may set it to zero.

According to the illustrated embodiment, once the thread determines that it is not holding the slotted read-write lock for reading, it may wait for all readers to drain, as in 1260, before proceeding with its transaction, as in 1270. As before, waiting for all readers to drain may comprise determining that the reader count is zero (e.g., the value of reader count field 1030 is zero) and that the read-bits of all slots are unset (e.g., hold a zero value).

As described above, in some embodiments, CAS-less slotted read-write locks may be used to increase system performance by reducing the number of computationally expensive atomic updates (e.g., CAS operations) that must be executed for each transaction. However, in some embodiments, the system may still need to perform some number of MEMBAR operations when acquiring read-locks (e.g., 1010) and/or when acquiring write-locks (e.g., 1240). Such MEMBAR operations may themselves be relatively computationally expensive.

According to various embodiments, a transactional memory system may improve performance in part by consolidating MEMBAR operations, such as by performing multiple lock acquisitions in bulk. Such a technique may be referred to herein as bulk synchronization.

In some cases, during transactional execution, a thread may need to acquire several locks before proceeding. For example, in an embodiment of TLRW with redo logging, a thread may need to acquire all necessary write-locks before performing its write-back operation. In embodiments with bulk synchronization, instead of acquiring each lock individually (e.g., by performing the method of FIG. 11 including at least one MEMBAR operation for each lock), the thread may interleave the acquisition operations into a combined bulk operation, such that separate MEMBAR operations of each acquisition are consolidated.

Figure 13:
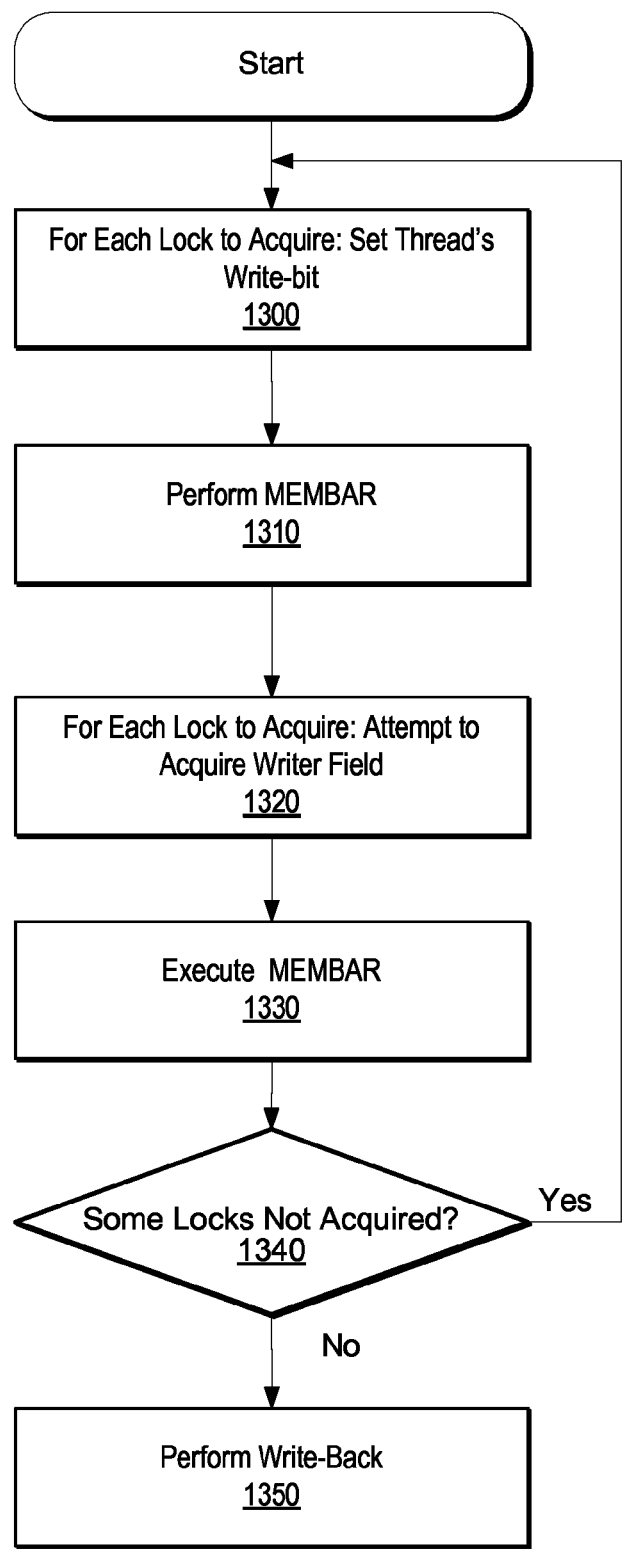
FIG. 13 is a flow diagram illustrating a method by which a slotted thread may acquire multiple CAS-less slotted read-write locks for write permissions using bulk synchronization, according to one embodiment.

FIG. 13 illustrates an example of bulk synchronization, according to one embodiment. The method of FIG. 13 may be performed by a slotted thread to acquire multiple CAS-less slotted read-write locks for writing, according to one embodiment.

According to the illustrated method, the thread may begin the method by setting its slot's write-bit in each lock (e.g., to a non-zero value), as in 1300. Once the write-bits have been set in each lock, the thread may execute a single consolidated MEMBAR operation, as in 1310. The single MEMBAR operation of 1310 may make all the write operations of 1300 globally visible to other threads. Thus, a single MEMBAR operation may apply to multiple lock acquisitions instead of performing multiple separate MEMBAR operations, as may otherwise be done.

According to the illustrated embodiment, the thread may then attempt to acquire the writer field of each lock, as in 1320. Acquiring the writer field may comprise attempting to write the thread's identifier into the writer field of each lock. However, recall that, as in 1020-930 of FIG. 10, the thread may only acquire the writer field of a given slotted read-write lock if the slotted read-write lock's writer lock (e.g., 1020) is not already held (e.g., is NULL) and no other write-bits in other slots are set. For each lock, if these conditions are true, then the thread may set the lock's writer field, such as to the thread's identifier. If one or both conditions are false for a given lock, then the thread may not acquire the writer field. For example, in one embodiment, if the thread may not acquire the writer field for a given lock, it may unset its write-bit in the lock.

According to the illustrated embodiment, after attempting to acquire the writer field of all needed locks, as in 1320, the thread may perform a MEMBAR operation, as in 1330. Thus, any memory writes performed in 1320 may be made globally visible to all other threads after the MEMBAR of 1330.

According to some embodiments, if any needed locks were not acquired, as indicated by the affirmative exit from 1340, the thread may return to 1300 and reattempt to acquire the remaining unacquired locks. For example, a given lock may have not been acquired if in 1320, the thread determined that it could not acquire the writer field of the lock, due to another thread already holding it.

In some embodiments, the thread may continue these attempts until it has acquired all necessary locks. In some embodiments, if a given timeout interval has passed since the start of the transaction, the thread may abort the transaction.

For example, in one embodiment, aborting may comprise releasing all locks (e.g., by storing NULL in the owner field and zero in the read-bits and write-bits) and reattempting the transaction.

According to the illustrated embodiment, once all the locks are acquired, as indicated by the negative exit from 1340, the thread may perform the write-back operation, as in 1350. The thread may then close out its transaction, which may comprise releasing all of the locks it holds in the normal manner described above.

In some embodiments, bulk synchronization may also be leveraged by unslotted threads to acquire slotted read-write locks. For example, the MEMBAR operation of 1240 in FIG. 12 may be consolidated using bulk synchronization. In one such embodiment, the thread may execute steps 1200-1230 for each lock to be acquired and then execute a single MEMBAR as in 1240. In some embodiments, steps 1200-1230 may be repeated until the thread has acquired all needed locks.

Figure 14:
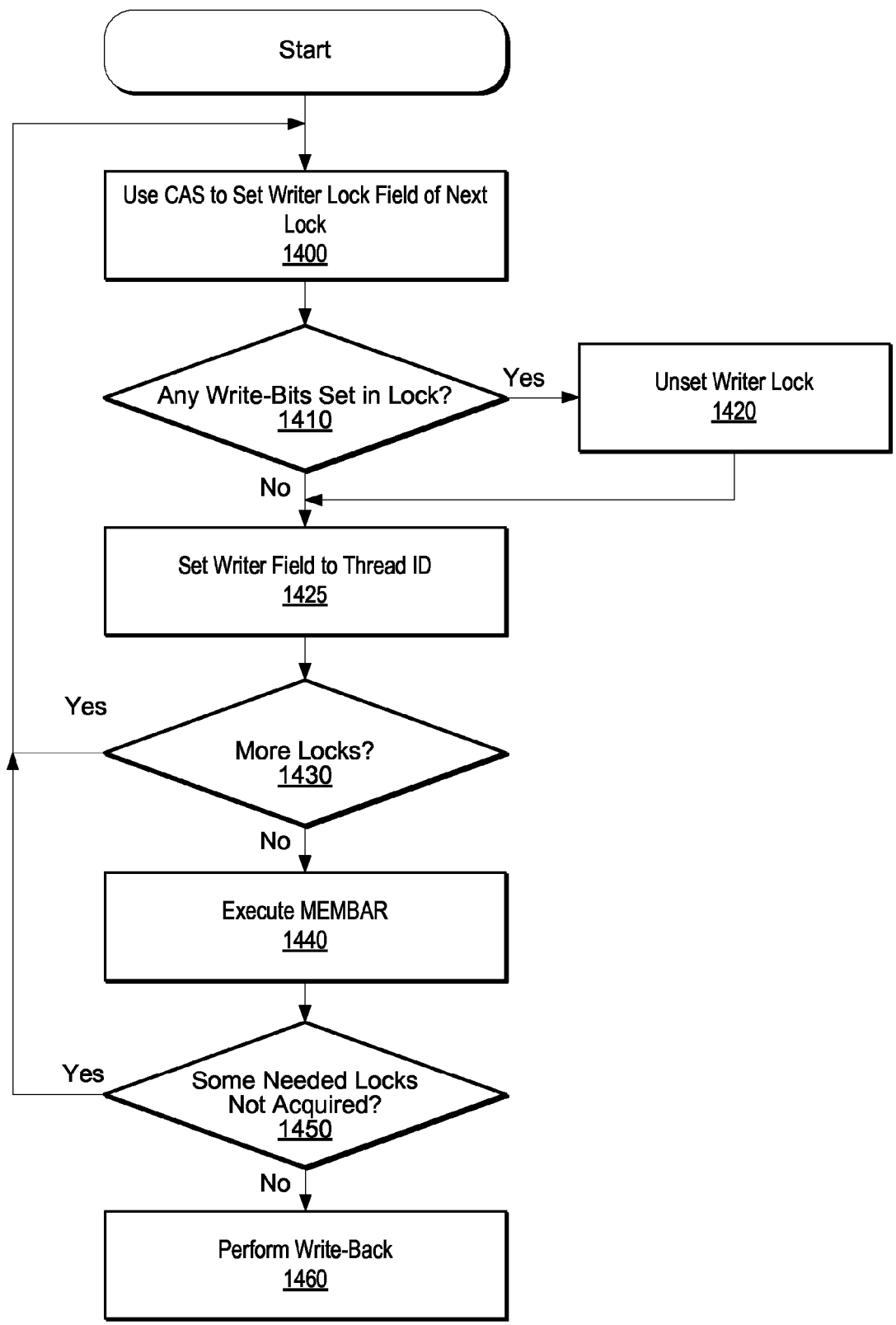
FIG. 14 is a flow diagram illustrating a method by which an unslotted thread may acquire multiple CAS-less slotted read-write locks for write permissions using bulk synchronization, according to one embodiment.

FIG. 14 is a flowchart illustrating one embodiment of a method by which an unslotted thread may use bulk synchronization when acquiring multiple CAS-less slotted read-write locks. For example, the illustrated method may be performed by the thread to acquire multiple write locks needed for a write-back operation.

According to the illustrated embodiment, the thread may begin by using a CAS operation to set the writer lock field of the first lock to acquire, as in 1400. If any write-bits are set in the lock, as indicated by the affirmative exit from 1410, then the thread may unset the writer lock, as in 1420. In some embodiments, this may be done using a conventional store operation.

According to the illustrated embodiment, the thread may then set the lock's writer field to the thread's ID, as in 1425, and determine if there are more locks in the transaction's write-set that it has not yet attempted to acquire using this bulk synchronization operation, as in 1430. If there are, as indicated by the affirmative exit from 1430, then the thread may attempt to acquire the next needed lock, such as by returning to 1400 and setting the writer lock field of the next lock.

In the illustrated embodiment, once all threads have been processed, as indicated by the negative exit from 1430, the thread may execute a single MEMBAR operation. Thus, any memory writes performed in 1400-1430 may be made globally visible to all other threads by the MEMBAR of 1440. If some locks have not been acquired (e.g., because a write-bit was detected as being set in 1410), then the thread may reattempt to acquire the needed locks, as indicated by the feedback loop from 1450 to 1400. Otherwise, the thread may perform its write-back operation, as in 1460.

In addition to acquiring write-locks, in various embodiments, bulk synchronization may be leveraged for acquiring read-locks. For example, in static transactions, the set of memory locations to be transacted upon (e.g., both read and written) may be known before the start of the transaction. In one example, a static transaction may be a k-CAS operation, wherein a set of memory locations may be atomically modified to hold a new set of values only if they hold an initial set of values. In such embodiments, since both the read-set and write-set is known in advance, a thread may leverage bulk synchronization to consolidate MEMBAR operations during the acquisition of both read and/or write locks.

For example, if a slotted thread needs to acquire a several CAS-less slotted read-write locks at the beginning of a static transaction, it may do so by performing a method similar to that of FIG. 13, but in addition, may also acquire slotted read-write locks for reading.

Figure 15:
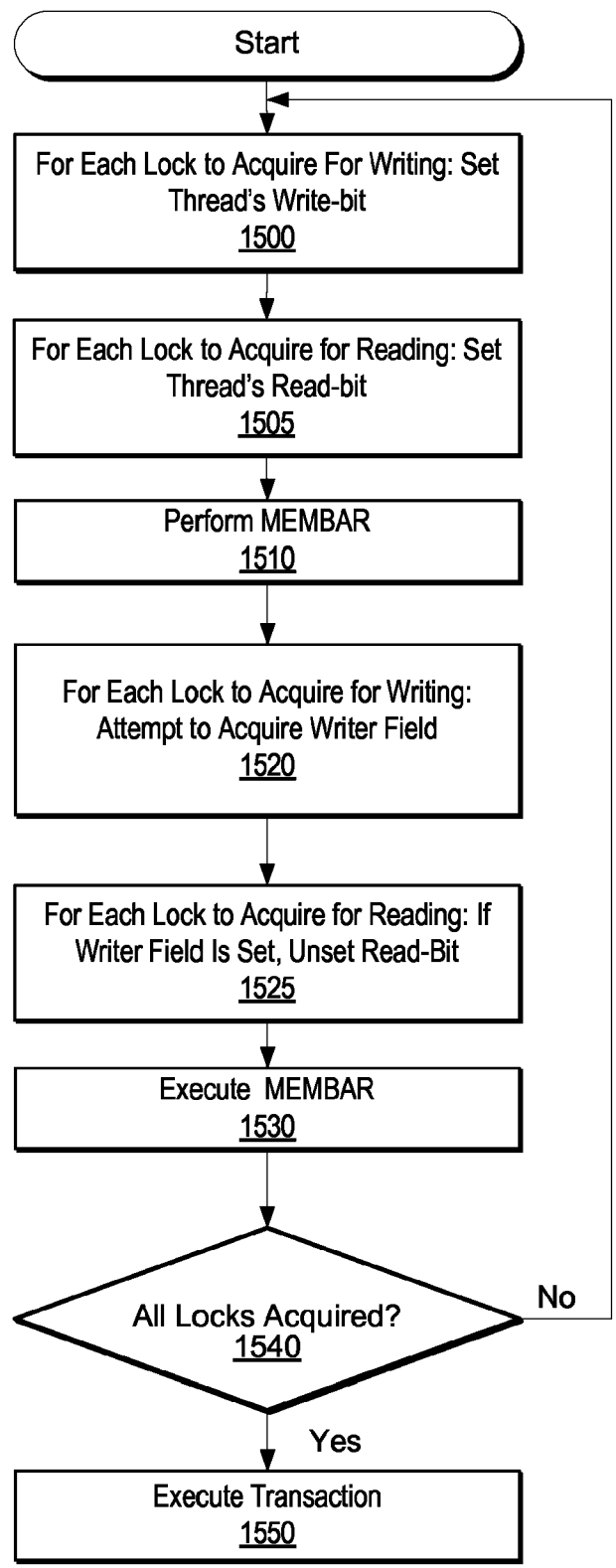
FIG. 15 is a flow diagram illustrating a method by which a slotted thread may acquire multiple CAS-less slotted read-write locks for read and/or write permissions using bulk synchronization, according to one embodiment.

FIG. 15 illustrates a method, according to one embodiment, by which a thread may acquire both read and write locks using bulk synchronization. The method may be performed by a thread to acquire locks at the start of a static transaction. The thread may begin the illustrated method by attempting to set the thread's write-bit in each lock that the thread needs to acquire for write permissions, as in 1500. Additionally, for any lock that the thread must acquire for reading, the thread may set its read-bit, as in 1505. The thread may then perform a MEMBAR operation, as in 1510, making the writes of 1500 and 1505 globally visible to other threads.

According to the illustrated embodiment, for each lock that the thread needs to acquire for writing, the thread may attempt to acquire the writer field. This step is analogous to 1320 of FIG. 13 and all conditions and variations described above for 1320 may be applied to 1520.

According to the illustrated embodiment, the thread may then determine, for each lock to be acquired for reading, whether the writer field of that lock is set. For any lock whose writer field is set (e.g., holds a non-NULL value), the thread may not acquire the lock for reading since another thread may currently hold it for writing. Therefore, for locks that are held by a writer, the thread may fail to acquire the lock for reading in this iteration, and unset the read-bit, as in 1525.

According to the illustrated embodiment, the thread may then execute a MEMBAR operation, as in 1530. If the thread was successful in acquiring all of the necessary read and write locks, as indicated by the affirmative exit from 1540, the thread may execute the transaction, as in 1550. Otherwise, if the thread was unable to acquire one or more locks, as indicated by the negative exit from 1540, the thread may return to the beginning of the method and attempt to acquire the still unacquired locks, as illustrated by the feedback loop. In some embodiments, subsequent iterations of the method may apply only to the as yet unacquired locks since the thread already holds the others. As before, in some embodiments, if the thread is unable to acquire the lock within a given time period, it may abort the transaction, which may comprise releasing all of the locks, delaying, and/or reattempting the transaction.

In various embodiments, unslotted threads may also acquire multiple locks for read and/or write permissions using bulk synchronization. In some embodiments, this may be done using a method similar to that of FIG. 14, except that in 1400, if the thread is to acquire the lock for writing, then it may use the CAS operation to increment the lock's reader count field 1030. Furthermore, for read locks, rather than performing the checks of 1410-1420, the thread may instead determine whether the writer field of the corresponding lock is NULL. If the writer field is NULL, then the thread has acquired the lock for reading. Otherwise, it has not acquired that read-lock and may decrement the reader count field (e.g., using a CAS operation) before attempting to acquire the next lock.

In some embodiments, bulk synchronization techniques may be used to reduce performance overhead in transactional locking systems other than TLRW. For example, bulk synchronization may be applied to other transactional locking protocols, such as TL2 as described in U.S. Patent Publication 2007/0198519, which uses versioned write-locks. In one such embodiment, CAS-less slotted read-write locks may be augmented to include the shared global clock of TL2. In such an embodiment, before performing the write-back, a thread may acquire all necessary write-locks in bulk, as described above. The thread may then perform the write-back and, as part of releasing the locks, update the version number based on the particular TL2 clock protocol being used. In such embodiments, reading a location may comprise operating on the writer field of the revised CAS-less slotted read-write lock as a versioned write lock, for example, by using the writer lock field and comparing the version number to the global clock using the particular TL2 clock protocol being used. Various other transactional locking protocols may be adapted to use bulk synchronization.

Figure 16:
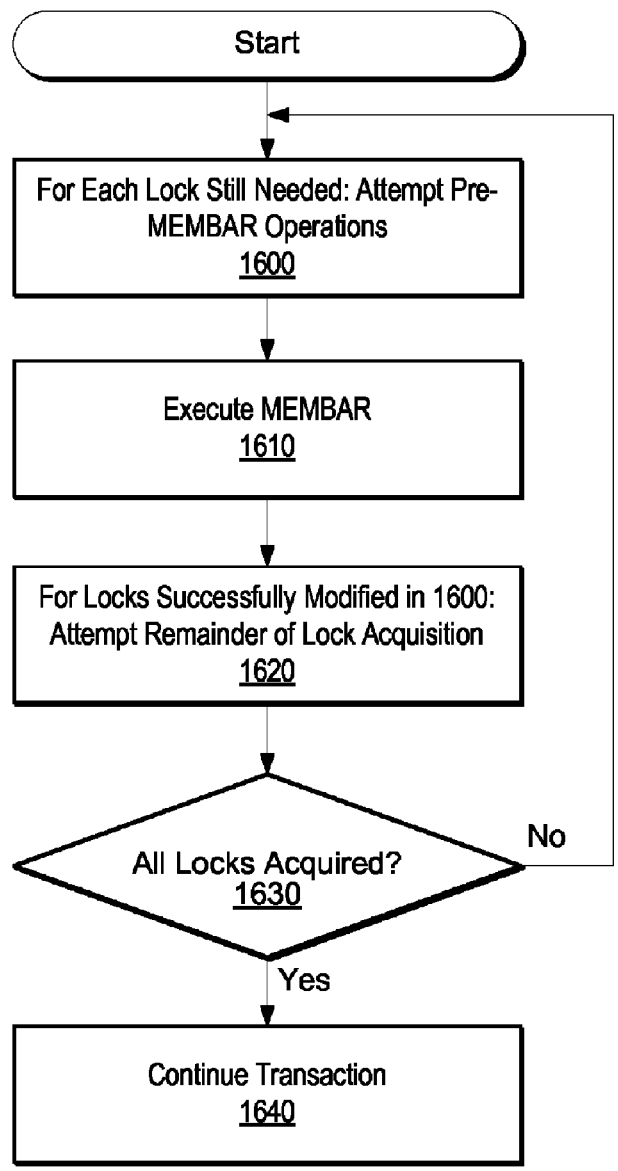
FIG. 16 is a flow diagram illustrating a general method for acquiring multiple locks using bulk synchronization, according to one embodiment.

FIG. 16 illustrates a general method for acquiring multiple locks in bulk, using bulk synchronization, according to some embodiments. The illustrated method begins by the STM attempting to perform one or more pre-MEMBAR operations on each lock to acquire, as in 1600. The operations of 1600 may include operations to acquire a plurality of locks for reading (e.g., 1505), for writing (e.g., 1500), or for both.

In some embodiments, phase 1600 may comprise one or more write operations for modifying one or more fields of each lock. In some instances, the thread may be unable to perform the necessary writes on one or more locks in 1600, such as if another thread holds the lock for writing. For example, in 1400 of FIG. 14, the thread modifies a write-bit, but if it detects that another write-bit is set, as in 1410, it must unset its own write-bit, as in 1420.

According to the illustrated embodiment of FIG. 16, the thread may then execute a MEMBAR operation, which may make any write operations performed in 1600 globally visible to other threads. Then, for the locks successfully modified in 1600, the thread may attempt to perform the remainder of the lock acquisition operations, as in 1620. In some embodiments (e.g., FIG. 13), the remainder may comprise executing one or more MEMBAR operations. If this is the case, then the thread may attempt to execute the remainder of the lock acquisition using a bulk synchronization technique, such as that of FIG. 16.

After completing all phases of the lock acquisitions, the thread may determine if it was able to acquire all needed locks, as in 1630. If so, as indicated by the affirmative exit from 1630, then it may continue executing its transaction, as in 1640, such as by executing a write-back. If the thread was unable to acquire one or more locks, as indicated by the negative exit from 1640, then it may attempt to repeat the bulk synchronization method for the unacquired locks.

Figure 17:
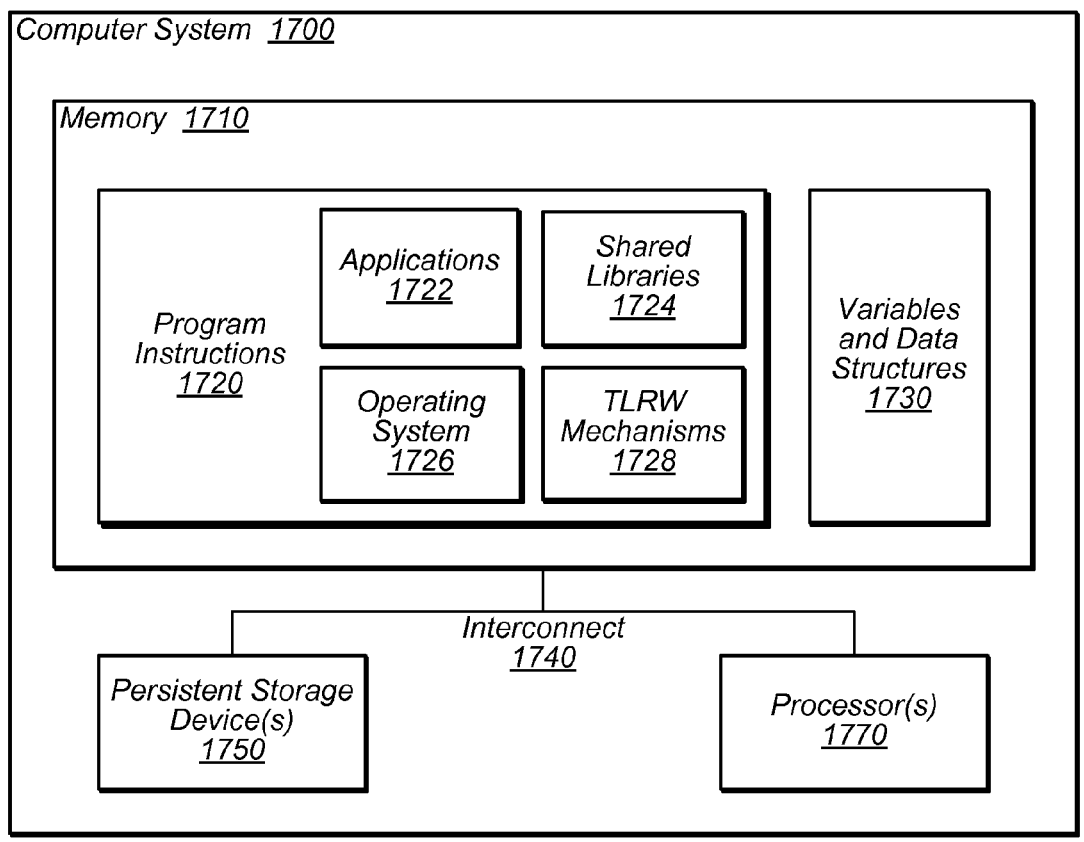
FIG. 17 is a block diagram of a computer system configured to perform transactional locking according to various embodiments, as described herein.

FIG. 17 illustrates a computing system configured to implement the systems and methods described herein, according to various embodiments. The computer system 1700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The transactional locking mechanisms described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Computer system 1700 may include one or more processors 1770, each of which may include multiple cores, any of which may be single or multi-threaded. The computer system 1700 may also include one or more persistent storage devices 1750 (e.g. optical storage, magnetic storage, hard drive, tape drive, solid state memory, etc) and one or more memories 1710 (e.g., one or more of cache, SRAM, DRAM, RDRAM, EDO RAM, DDR 12 RAM, SDRAM, Rambus RAM, EEPROM, etc.). Various embodiments may include fewer or additional components not illustrated in FIG. 17 (e.g., video cards, audio cards, additional network interfaces, peripheral devices, a network interface such as an ATM interface, an Ethernet interface, a Frame Relay interface, etc.)

The one or more processors 1770, the storage device(s) 1750, and the system memory 1710 may be coupled to the system interconnect 1740. One or more of the system memories 1710 may contain program instructions 1720. Program instructions 1720 may include program instructions executable to implement one or more applications 1722, shared libraries 1724, operating systems 1726, and/or TLRW mechanisms 1728, as described herein. Program instructions 1720 may be encoded in platform native binary, any interpreted language such as Java™ byte-code, or in any other language such as C/C++, Java™, etc or in any combination thereof.

The program instructions 1720 may include software components and/or mechanisms configured to provide functions, operations and/or other processes for implementing transactional memory mechanisms, which may include TLRW and/or transactional locking with bulk synchronization, as described herein. For example, TLRW mechanisms 1728 may include program instructions executable to abort and/or commit transactions, acquire and/or release CAS-less or regular read-write byte locks, and/or employ bulk synchronization techniques, as described herein. Software components to support such functions may exist in one or more of TLRW mechanisms 1728, shared libraries 1724, and/or operating system 1726. In some embodiments, applications 1722 may comprise one or more multi-threaded applications configured to use transaction-based synchronization mechanisms.

The system memory 1710 may further comprise variables and data structures 1730. Variables and data structures 1730 may be used to store data used in TLRW, such as slotted read-write locks, stripe metadata, etc. Stripe metadata may include mappings of stripe identifiers to memory addresses and/or to lock metadata (e.g., instances of slotted read-write locks)

Although the embodiments above have been described in considerable detail, numerous variations and modifications will become apparent to those skilled in the art once the above disclosure is fully appreciated. For example, bulk synchronization may be applied to various other transactional locking contexts, such as semi-static k-location transactions in which the set of location to be written is known in advance and the set of locations read is determined dynamically. It is intended that the following claims be interpreted to embrace all such variations and modifications.

What is claimed:
1. A system, comprising:
one or more processors;
a memory coupled to the one or more processors and storing program instructions executable by the one or more processors to implement a thread configured to acquire a plurality of software locks in bulk, wherein:

the thread is one of multiple program threads concurrently executing and accessing shared system memory locations;

each of the software locks locks one of the shared system memory locations;

the plurality of software locks are a concurrency control mechanism controlling concurrent access to the shared system memory locations by the multiple program threads; and said acquiring obtains the plurality of software locks in bulk via execution of a memory barrier operation, comprising:

storing a value for the thread in each of the plurality of software locks; and executing the memory barrier operation to ensure that, before the thread executes any memory access operation on the shared system memory locations that is subsequent to the memory barrier operation in program order, the values for the thread that are stored in each of the plurality of software locks are each visible to the other threads of the multiple program threads concurrently executing in the system;

wherein the memory barrier operation is sufficient to obtain the plurality of software locks in bulk without performing a separate memory barrier operation for each of the plurality of software locks.

2. The system of claim 1, wherein the program instructions are further executable to implement a transactional memory system and wherein said acquiring a plurality of software locks in bulk is performed as part of executing a series of program instructions as an atomic transaction.

3. The system of claim 2, wherein the atomic transaction comprises a static transaction.

4. The system of claim 2, wherein the transactional memory system utilizes a global version clock.

5. The system of claim 1, wherein:

one of the plurality of software locks comprises a read-write lock; and the program instructions are further executable to implement a locking protocol wherein the read-write lock may be held either by any number of the multiple program threads for reading, or by at most one of the multiple programs threads for writing.

6. The system of claim 5, wherein:

the one of the plurality of software locks comprises a read-write bytelock, the read-write bytelock comprising a slot field; and the program instructions are further executable to implement a locking protocol wherein, the slot field is associated with at most one thread of the multiple program threads at any time, wherein the one thread is the only thread of the multiple program threads permitted to modify a value of the slot field.

7. The system of claim 6, wherein:

the read-write bytelock comprises a CAS-less read-write bytelock;

the slot field comprises one or more read-bits usable, at least in part, by the associated thread to acquire the one of the plurality of software locks for reading; and the slot field comprises one or more write-bits usable, at least in part, by the associated thread to acquire the one of the plurality of software locks for writing.

8. A non-transitory computer-readable storage medium storing program instructions executable by one or more processors to implement a thread configured to acquire a plurality of software locks in bulk, wherein:

the thread is one of multiple program threads concurrently executing and accessing shared system memory locations;

each of the software locks locks one of the shared system memory locations;

the plurality of software locks are a concurrency control mechanism controlling concurrent access to the shared system memory locations by the multiple program threads; and said acquiring obtains the plurality of software locks in bulk via execution of a memory barrier operation, comprising:

storing a value for the thread in each of the plurality of software locks; and executing the memory barrier operation to ensure that, before the thread executes any memory access operation on the shared system memory locations that is subsequent to the memory barrier operation in program order, the values for the thread that are stored in each of the plurality of software locks are each visible to the other threads of the multiple program threads being concurrently executed by the one or more processors;

wherein the memory barrier operation is sufficient to obtain the plurality of software locks in bulk without performing a separate memory barrier operation for each of the plurality of software locks.

9. The computer-readable storage medium of claim 8, wherein the program instructions are further executable to implement a transactional memory system and wherein said acquiring a plurality of software locks in bulk is performed as part of executing a series of program instructions as an atomic transaction.

10. The computer-readable storage medium of claim 9, wherein the atomic transaction comprises a static transaction.

11. The computer-readable storage medium of claim 9, wherein the transactional memory system utilizes a global version clock.

12. The computer-readable storage medium of claim 8, wherein:

one of the plurality of software locks comprises a read-write lock; and the program instructions are further executable to implement a locking protocol wherein the read-write lock may be held either by any number of the multiple program threads for reading, or by at most one of the multiple programs threads for writing.

13. The computer-readable storage medium of claim 12, wherein:

the one of the plurality of software locks comprises a read-write bytelock, the read-write bytelock comprising a slot field; and the program instructions are further executable to implement a locking protocol wherein, the slot field is associated with at most one thread of the multiple program threads at any time, wherein the one thread is the only thread of the multiple program threads permitted to modify a value of the slot field.

14. The computer-readable storage medium of claim 13, wherein:

the read-write bytelock comprises a CAS-less read-write bytelock;

the slot field comprises one or more read-bits usable, at least in part, by the associated thread to acquire the one of the plurality of software locks for reading; and the slot field comprises one or more write-bits usable, at least in part, by the associated thread to acquire the one of the plurality of software locks for writing.

15. A computer-implemented method, comprising:
a multi-threaded computer system executing program instructions for a thread in a multi-threaded system acquiring a plurality of software locks in bulk, wherein:
the thread is one of multiple program threads concurrently executing and accessing shared system memory locations;
each of the software locks locks one of the shared system memory locations;
the plurality of software locks are a concurrency control mechanism controlling concurrent access to the shared system memory locations by the multiple program threads; and
said acquiring obtains the plurality of software locks in bulk via execution of a memory barrier operation, comprising:
storing a value for the thread in each of the plurality of software locks; and
executing the memory barrier operation to ensure that, before the thread executes any memory access operation on the shared system memory locations that is subsequent to the memory barrier operation in program order, the values for the thread that are stored in each of the plurality of software locks are each visible to the other threads of the multiple program threads concurrently executing in the system;
wherein the memory barrier operation is sufficient to obtain the plurality of software locks in bulk without performing a separate memory barrier operation for each of the plurality of software locks.

16. The method of claim 15, wherein said acquiring the plurality of software locks in bulk is performed as part of executing a series of program instructions as an atomic transaction in a transactional memory system.

17. The method of claim 16, wherein the atomic transaction comprises a static transaction.

18. The method of claim 16, wherein the transactional memory system utilizes a global version clock.

19. The method of claim 15, wherein:
one of the plurality of software locks comprises a read-write lock; and
the read-write lock may be held either by any number of the multiple program threads for reading, or by at most one of the multiple programs threads for writing.

20. The method of claim 19, wherein:
the one of the plurality of software locks comprises a slot field associated with at most one thread of the multiple program threads at any time;
the associated one thread is the only thread of the multiple program threads permitted to modify a value of the slot field;
the slot field comprises one or more read-bits usable, at least in part, by the associated thread to acquire the one of the plurality of software locks for reading; and
the slot field comprises one or more write-bits usable, at least in part, by the associated thread to acquire the one of the plurality of software locks for writing.

* * * * *